United States Patent
Datta

(10) Patent No.: US 10,467,571 B2
(45) Date of Patent: Nov. 5, 2019

(54) ROBOTIC CONDUCTOR OF BUSINESS OPERATIONS SOFTWARE

(71) Applicant: Asim Kumar Datta, Cambridge (GB)

(72) Inventor: Asim Kumar Datta, Cambridge (GB)

( * ) Notice: Subject to any disclaimer, the term of this patent is extended or adjusted under 35 U.S.C. 154(b) by 308 days.

(21) Appl. No.: 15/206,286

(22) Filed: Jul. 10, 2016

(65) Prior Publication Data

US 2018/0012119 A1 Jan. 11, 2018

(51) Int. Cl.
*G06F 17/30* (2006.01)
*G06Q 10/06* (2012.01)
*G06Q 10/10* (2012.01)

(52) U.S. Cl.
CPC ......... *G06Q 10/0633* (2013.01); *G06Q 10/10* (2013.01)

(58) Field of Classification Search
CPC ..... G06N 3/006; G06Q 10/0633; G06Q 10/10
USPC .......................................................... 706/11
See application file for complete search history.

(56) References Cited

U.S. PATENT DOCUMENTS

| | | | | |
|---|---|---|---|---|
| 8,478,633 B2 * | 7/2013 | Chang | ................ | G06Q 10/06 705/7.38 |
| 8,606,622 B2 * | 12/2013 | Chang | ................ | G06Q 10/06 705/7.38 |
| 2004/0199517 A1 * | 10/2004 | Casati | ............... | G06F 17/30592 |
| 2007/0005410 A1 * | 1/2007 | Kasravi | ............ | G06Q 10/06316 719/318 |
| 2007/0150520 A1 * | 6/2007 | Bennett | ................... | G06Q 10/06 |
| 2012/0166234 A1 * | 6/2012 | Drittler | ................ | G06Q 10/063 705/7.11 |
| 2015/0032415 A1 * | 1/2015 | Van Cutsem | ............. | G06F 8/77 702/187 |
| 2017/0123955 A1 * | 5/2017 | Hayashi | ............. | G06F 11/3034 |

* cited by examiner

*Primary Examiner* — Sheree N Brown

(57) ABSTRACT

This invention relates to non-mechanical robotic software for conducting, dictating and monitoring day-to-day regular activities of business operations of an organization being automated by adaptation of principle of servomechanism closed loop feedback control system of engineering. A "Business Operation" is defined as a sequence of particular order in which related structured activities that serve a particular business goal follow each other, and structured activities are processes and events. The control system operates in real time and automatic generation of feedback for identifying next activity to be conducted is enabled by an innovative data driven automatic generation of feedback technique. This closed loop feedback control system continues conducting activities of all occurrences of business operations automatically until a feedback identifies a terminator activity of a particular occurrence marking completion of conducting that occurrence.

1 Claim, 19 Drawing Sheets

A broad depiction of overall working of Robotic EDFA Closed Loop Control System A broad depiction of overall working of Robotic EDFA Closed Loop Control System A single flowchart that depicts the overall working of the software Continued to Fig. 2B

Fig. 2B

A single flowchart that depicts the overall working of the software

Continued-from Fig. 2A

↓

PSMIM starts Program in Module "F".

↓

Flowchart (Fig. 7.3) of Program of Module "F" shows functions of this Module.
Gist: 1. Module "F" ("F" for receiving Feedback for each normal Process) initiates normal Process identified from Feedback either by alerting concerned Department for starting processing by staff members to be followed up by "A" or leaves conducting automated processing action to module "A".
2. Passes Program "flow" to Module "A".

↓

PSMIM starts Program in Module "A".

↓

Flowchart (Fig. 7.4) of Program of Module "A" shows functions of this Module.
Gist: 1. Module "A" ("A" for Action) takes necessary action either for executing next automated process via Automated Process Library or waits for reply from concerned department to alert message sent from module "F" confirming completion of processing by staff members, thereupon completes recording of this Process.
2. Generates Feedback to identify next Event.
3. Passes Program "flow" and Feedback to Module "E" to deal with either next "Milestone" Event or a terminator Event.

↓

PSMIM re-starts Program in Module "E".
Program continues to "flow" along modules of EDFA Loop UNTIL a Feedback is generated in a module to identify a terminator activity of the occurrence of Business Operation.

↓

( Stop )

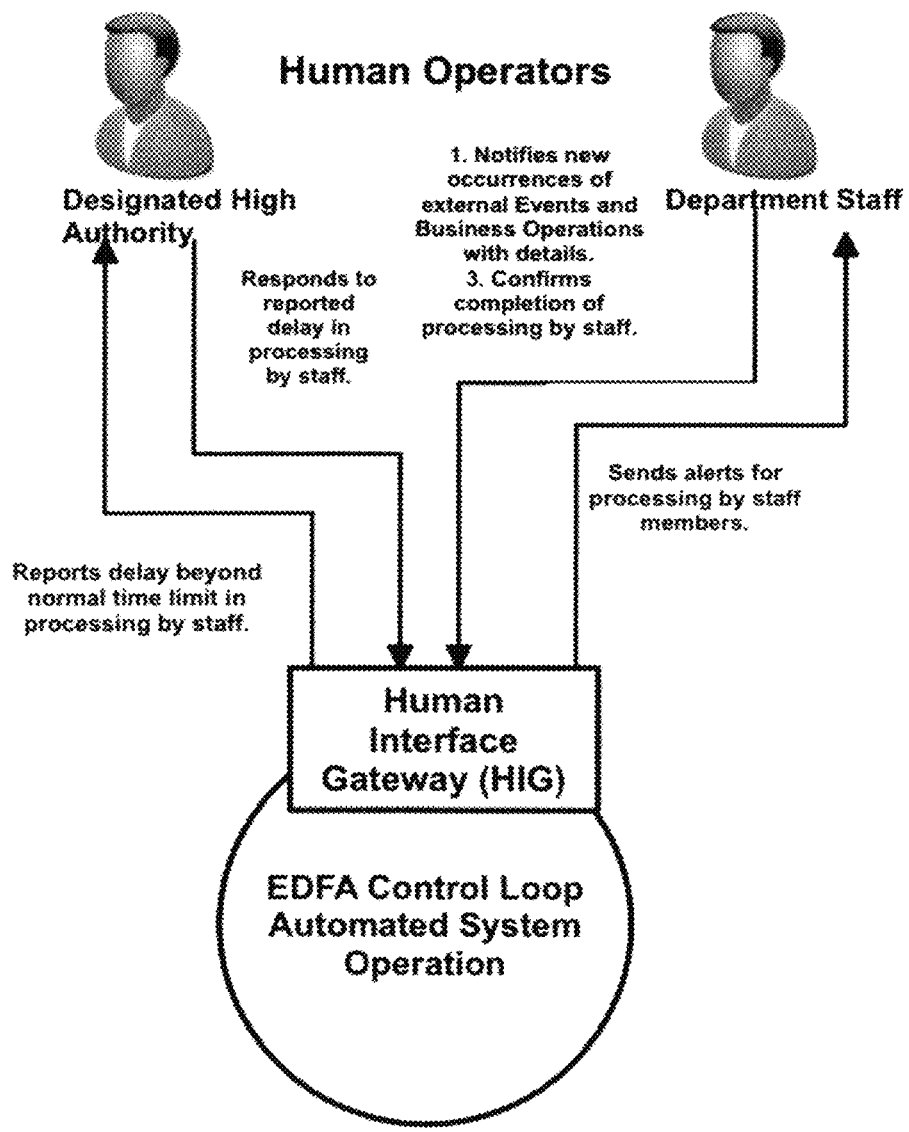

Flowchart of Program of "Management of Processing by Staff" at Human Interface Gateway Flowchart of "Program Starter Mechanism in Modules" to start Program in a Module of EDFA Closed Loop Control System

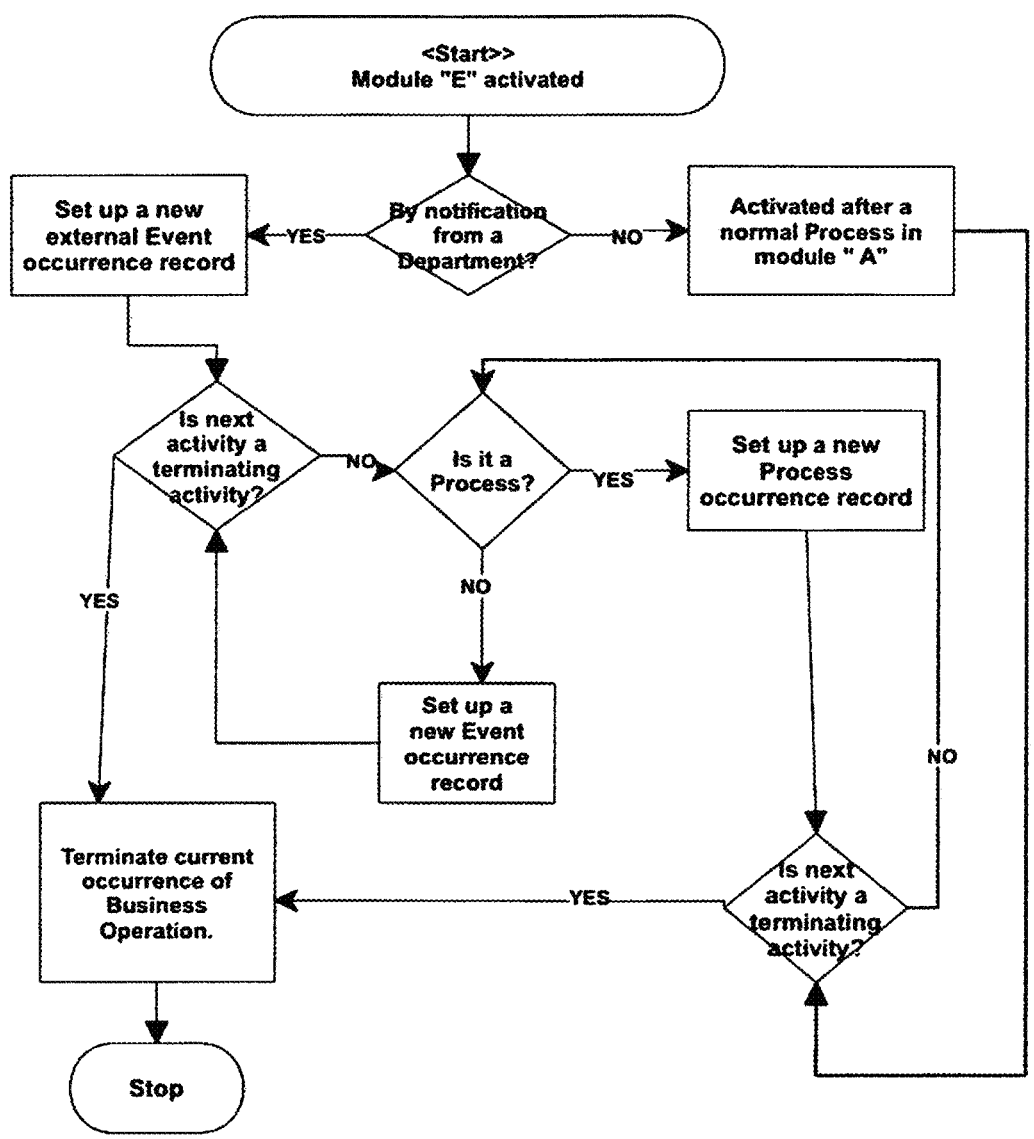
Fig. 7.1
Flowchart of Program in "E" Module

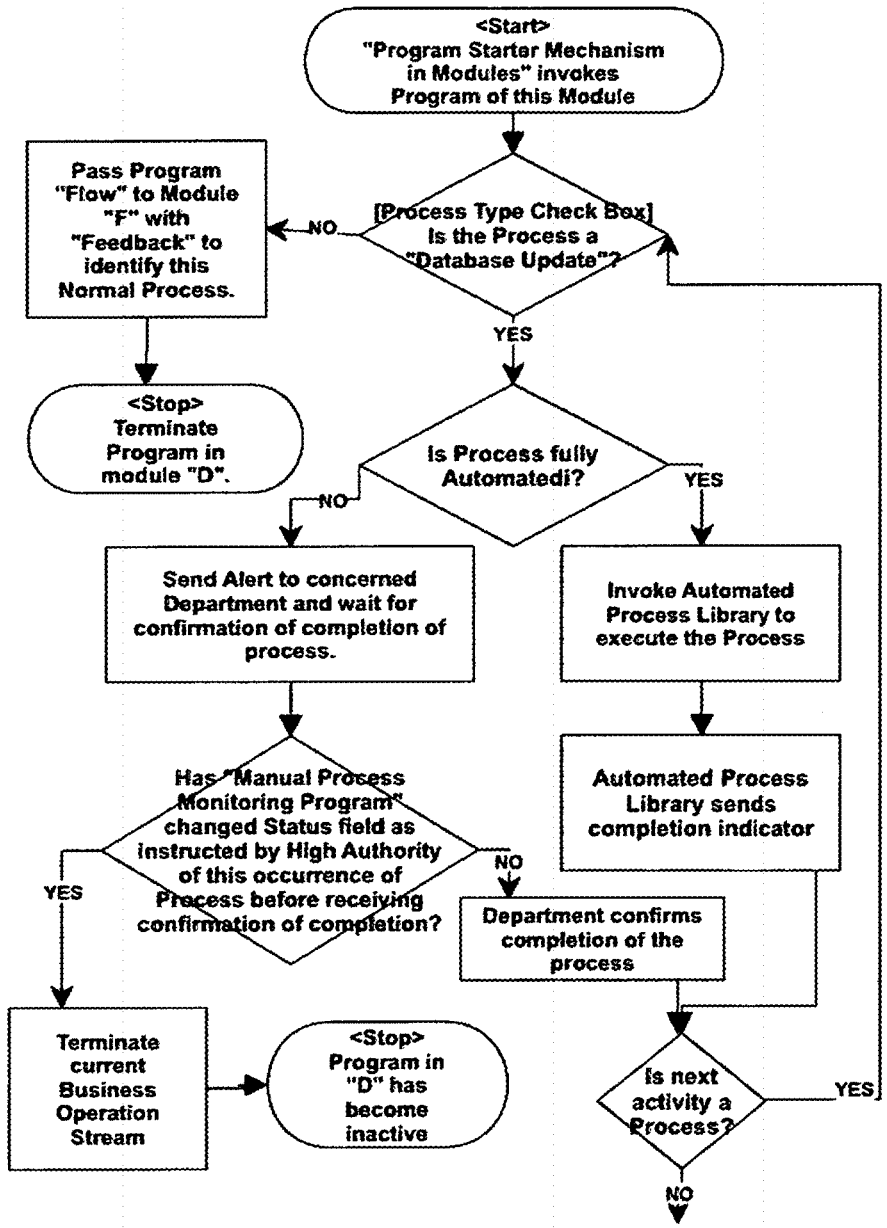
Fig. 7.2A
Continued to Fig. 7.2B

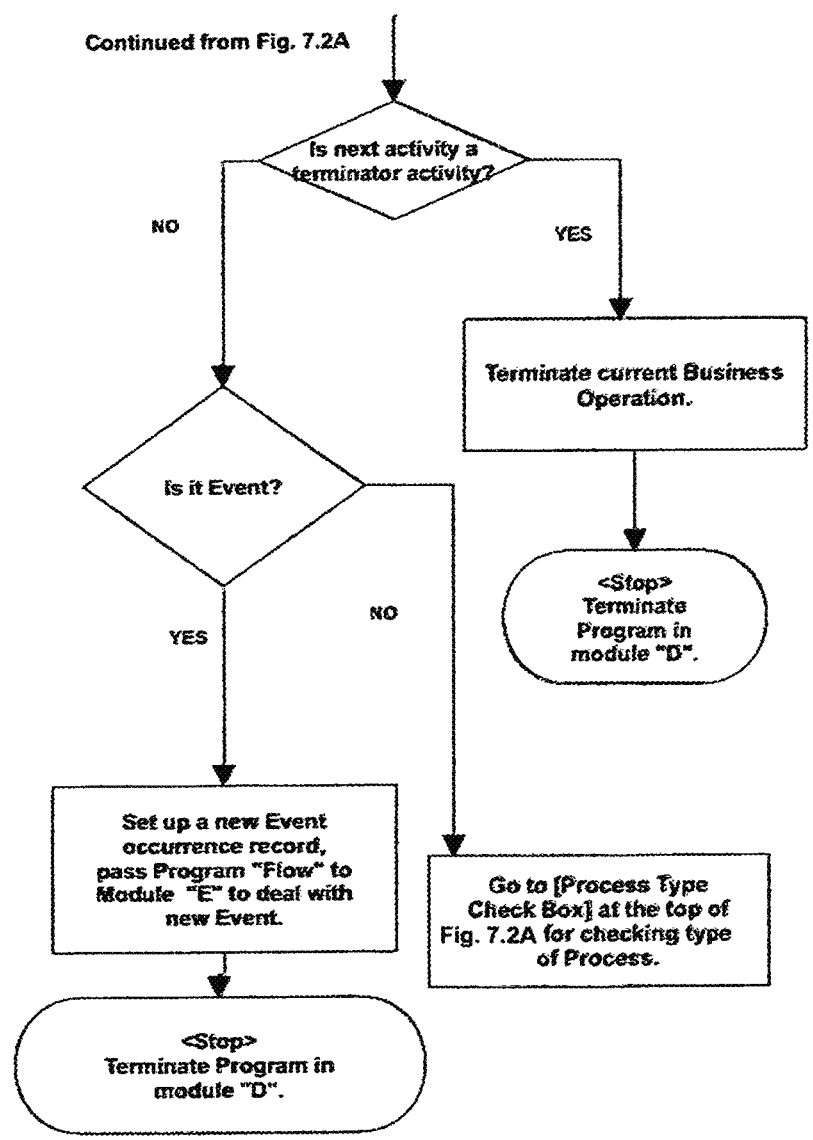
Fig. 7.2B

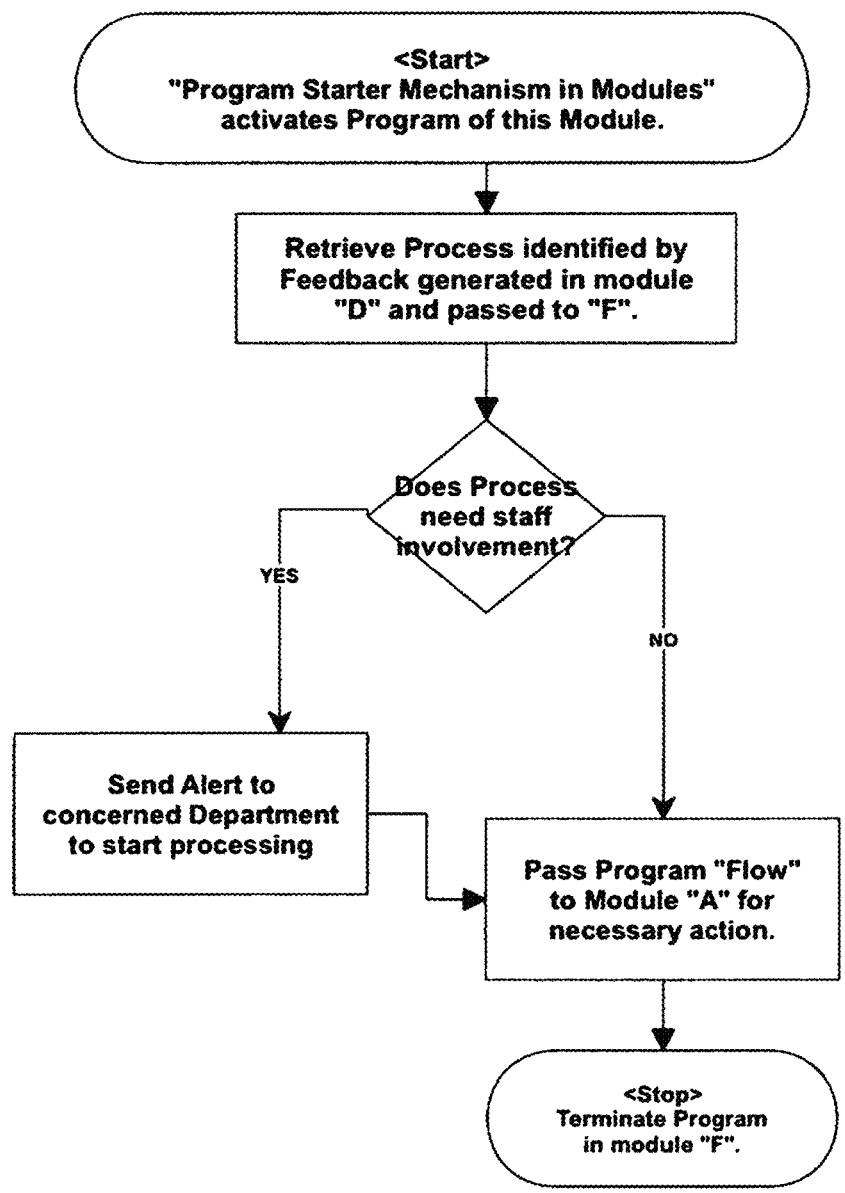

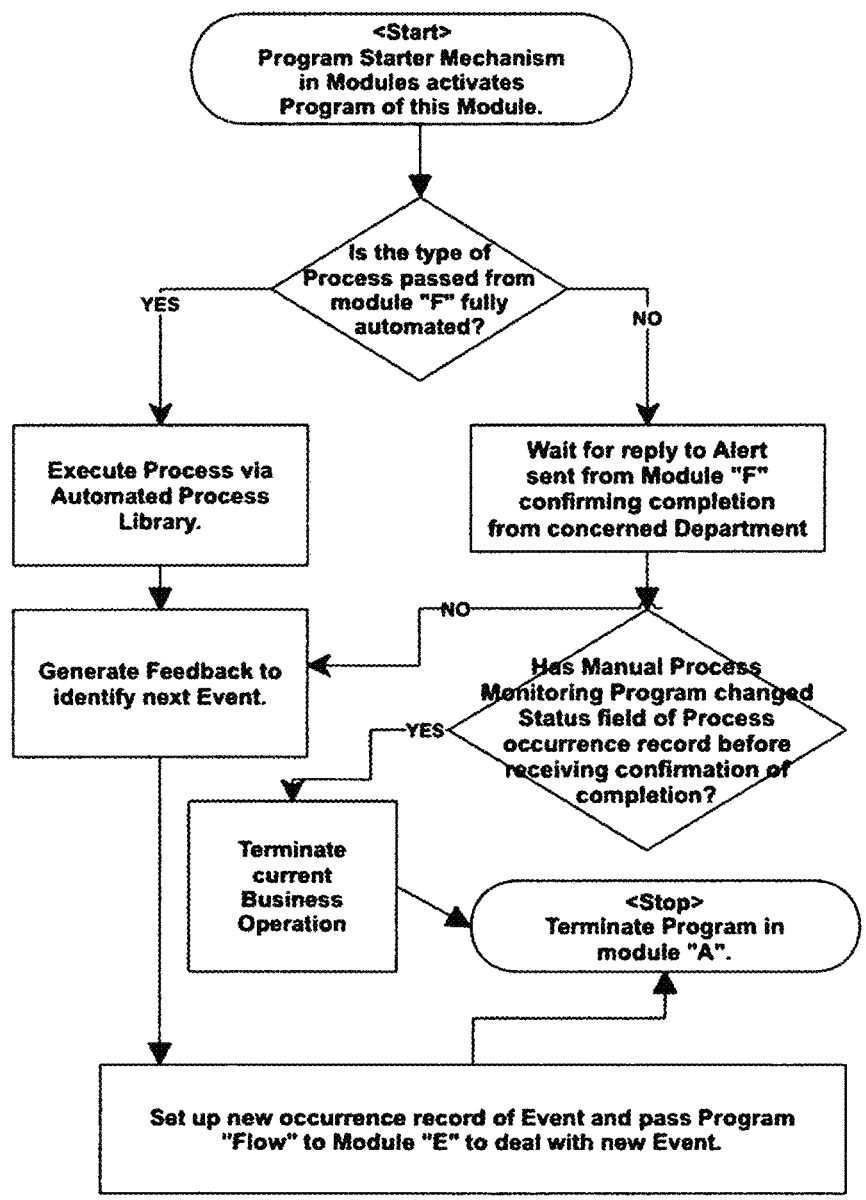
Fig. 7.4
Flowchart of Program in "A" Module

Flowchart of Front Routine Program at Automated Process Library

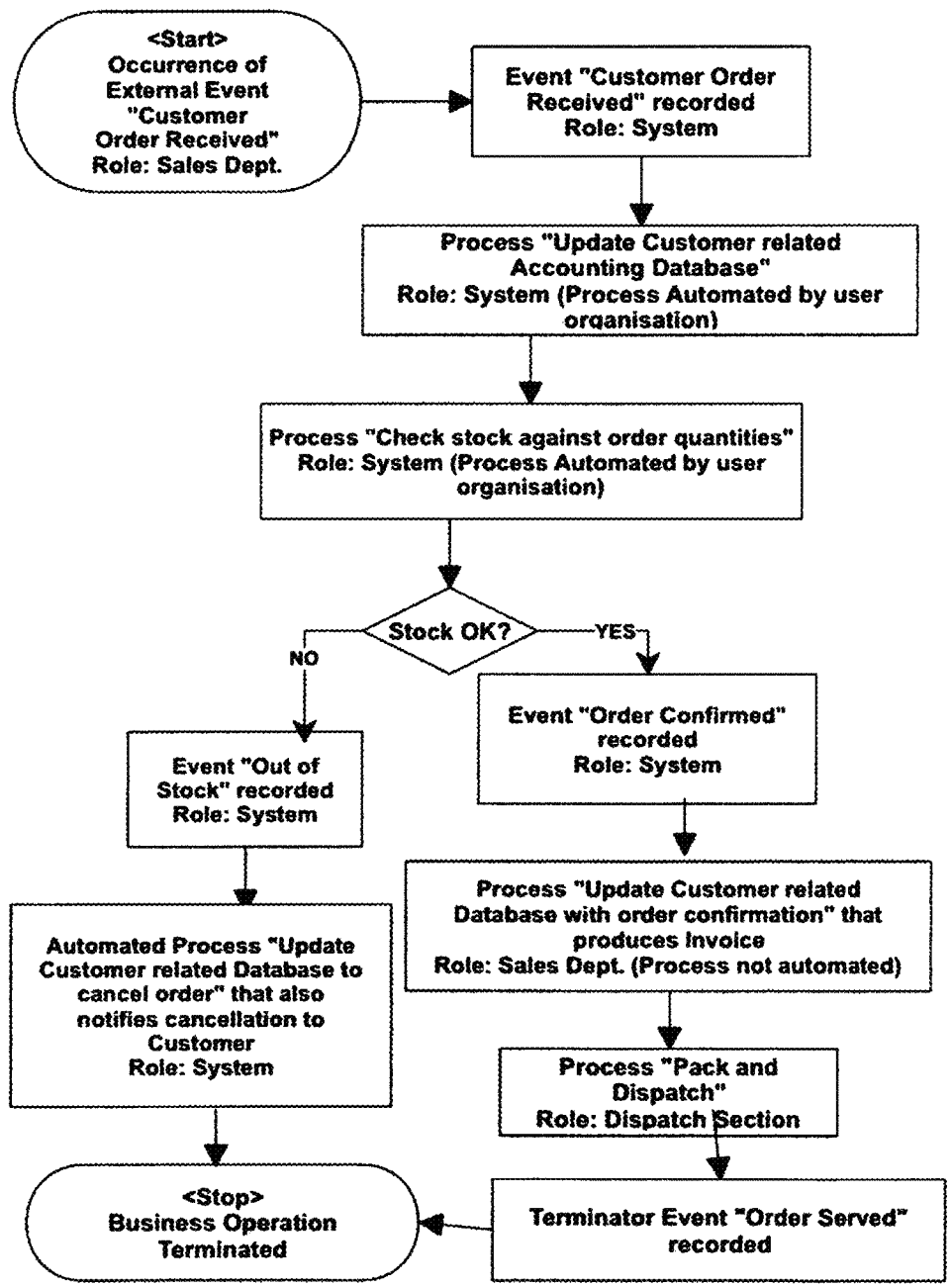

Fig. 9.2
Prototype Stage 2
Program of DDAGF Technique: Creates and Populates instances of Master Tables

Business Operation Master Table
Name: Serve Customer Order
Id: BO1
First Event Id: E1

Event Master Table
Name: Customer Order Received
Id: E1
Next Process Id: P1
Next Event Id: <Blank>

Process Master Table
Name: Update Database with Customer Order
Id: P1
Type: A (Automated)
Category: DBU (Database Update)
Next Process Id: P2
Next Event Id: <Blank>
Role: System

Process Master Table
Name: Check Stock against Order
Id: P2
Type: AD (Automated Decision)
Decision Result: <Blank>
Next Process Id: <Blank>
Next Event Id: E2
Next-N Process Id: <Blank>
Next-N Event Id: E3
Role: System

Event Master Table
Name: Customer Order Confirmed
Id: E2 (Note: Next Event Id for Decision Result "Y")
Next Process Id: P3
Next Event Id: <Blank>

Event Master Table
Name: Out of Stock
Id: E3 (Note: Next-N Event Id for Decision Result "N")
Next Process Id: P6
Next Event Id: <Blank>

Process Master Table
Name: Update Database with Customer Order Confirmation (produces Invoice)
Id: P3
Type: H (for Human Staff)
Category: DBU(for Database Update)
Next Process Id: P4
Next Event Id: <Blank>
Role: D101 (Sales Dept.)
Normal Max Time: 24 (Business Hrs)

Process Master Table
Name: Update Database for Customer Order Cancellation (notifies Customer)
Id: P6
Type: H(Human Staff)
Category: DBU(Database Update)
Next Process Id: TP(Terminator Process)
Next Event Id: TE (Terminator Event)
Normal Max Time: 24 (Business Hrs)
Role: D101 (Sales Dept.)

Process Master Table
Name: Pack and Dispatch
Id: P4 Type: H(Human Staff)
Category: NOR (Normal)
Next Process Id: <Blank>
Next Event Id: E4
Role: D150 (Dispatch Section)
Normal Max Time: 120 (Business Hrs)

Event Master Table
Name: Customer Order Served
Id: E4
Next Process Id: TP (Terminator Process)
Next Event Id: TE (Terminator Event)

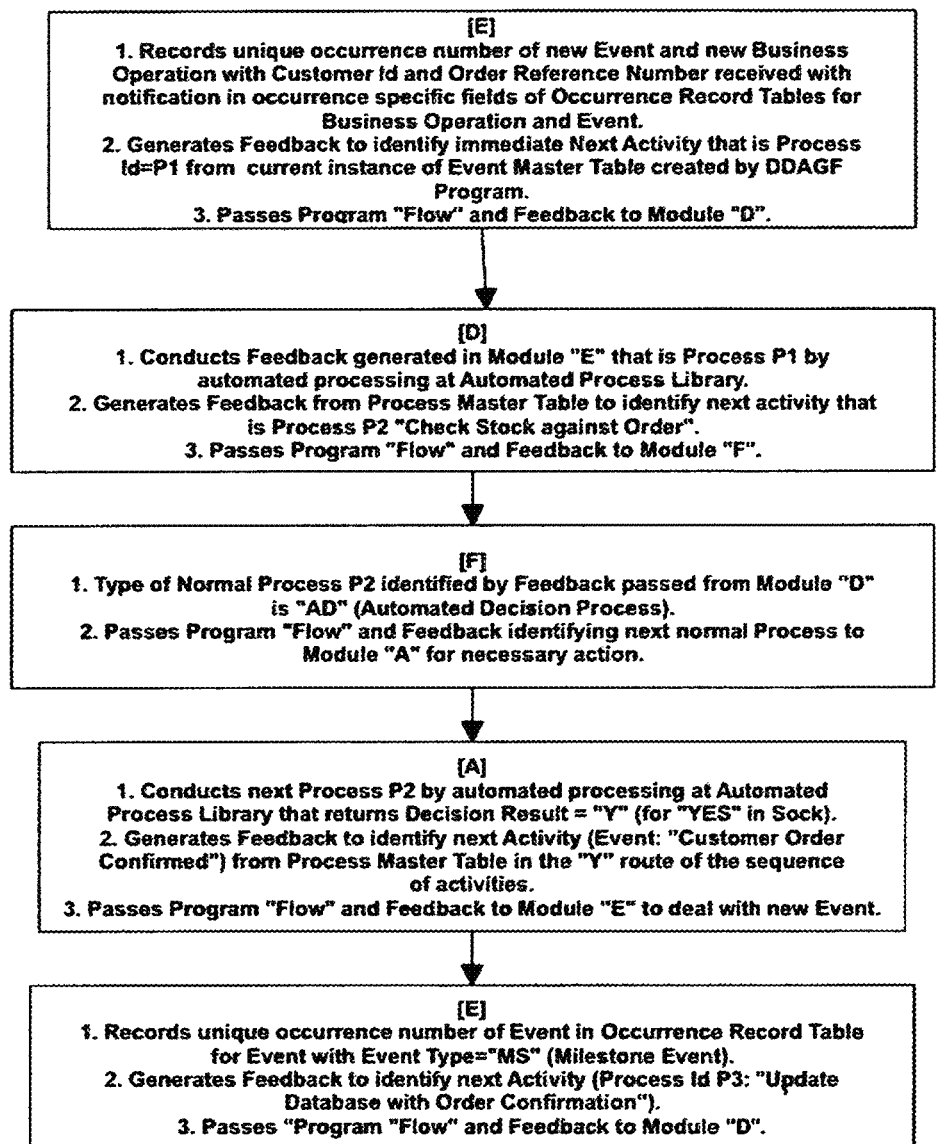
Fig. 9.3A
Prototype Stage 3
Working of EDFA Closed Loop Feedback Control System of Robotic Software
Continued to Fig. 9.3B

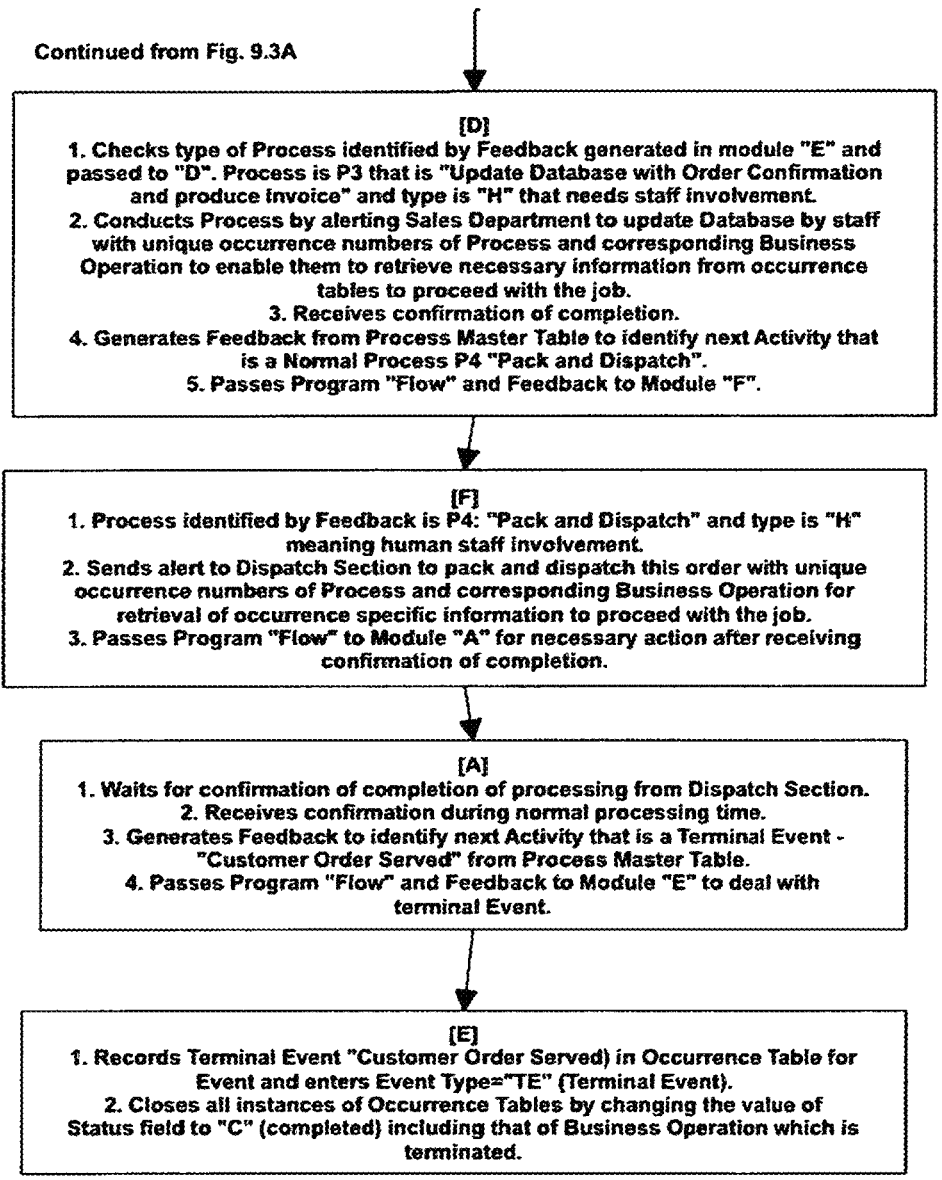

ROBOTIC CONDUCTOR OF BUSINESS OPERATIONS SOFTWARE

BACKGROUND OF THE INVENTION

Field of the Invention

This invention relates to hitherto unknown field of non-mechanical robotic type of software with full responsibility of conducting, dictating and monitoring day-to-day regular activities of business operations of an organisation by operating in real time and acting as the sole driving force having been automated by adaptation of the principle of servo-mechanism closed loop feedback control system of engineering in conducting business activities of defined business operations from start to finish as distinct from business process management type of software that are primarily for aiding and improving business functions.

Description of the Related Art

[1] Regular business activities of a business operation conducted by the software are defined as follows:
  A business operation is defined as a business activity with sequence of combination of related structured business activities in a particular order that follow each other to serve a particular business goal and related structured business activities conducted by this software are of two types, one type is process and the other type is event, and these two types of activities are defined as follows:
    A process of a business operation is defined as a method of the stages involved in performing a certain business procedure.
    An event of a business operation is defined as a happening of importance or outcome of a process in the course of a business operation.
    Hereinafter the term business activity will collectively mean overall business activity of business operation and also two related business activities of said process and said event. Whereas the aforesaid two related business activities of said process and said event hereinafter may be collectively referred to as activity or activities to mean process or event or both.
    However, although overall business activity of whole of a business operation consists of sequence of combination of a number of related activities, the particular activities involved in a business operation do not necessarily belong exclusively to the business activity of that business operation because any one or more of these activities can also take place in business activities of other business operations and involvement of any activity in different business operations is uniquely identified by the unique identity of the corresponding business operation.
  Aforesaid sequence of activities involved in a business operation is not necessarily a fixed sequence as it may vary in different occurrences of same business operation depending on the outcome of processes in a sequence. This software can deal with such variation of sequence but does not support any activity producing two or more parallel sequences of activities, therein parallel sequences of activities mean two or more activities occurring simultaneously in different sequences.

[02] Conducting business activities is defined as follows:
  Conducting overall business operation is defined as dealing with all activities involved in a business operation from start to finish, starting with recording of information about an occurrence of a business operation in the data table of occurrences of business operation of the software in order to keep track of each occurrence of business operation identified by the unique occurrence number of business operation in a multi occurrence and multi processing environment, and then conducting the related structured activities of processes and events involved in that business operation as follows:
    (a) Conducting a process is defined as:
      Either getting a process executed by an automated computerized processing application or initiating to get the process performed by staff members of user organization and thereafter pursuing the activity until the process is completed.
      Thereafter recording of information about the occurrence of the process in the data table of occurrences of process in the software in order to keep track of occurrence of every process identified by the unique occurrence number of the process in the sequence of activities involved in the unique occurrence number of a business operation in a multi occurrence and multi processing environment.
    (b) Conducting an event is defined as:
      Recording of information about an occurrence of event in the data table of occurrences of event in the software in order to keep track of occurrence of every event identified by the unique occurrence number of an event in the sequence of activities involved in the unique occurrence number of a business operation in a multi occurrence and multi processing environment.
      Recording of information of unique occurrences of each of the aforesaid three business activities serves the following purposes:
      (i) To enable retrieval of information specific to an occurrence from the corresponding data table of occurrences about the unique occurrence of a business activity by user organization in real time because of the advantage offered by the operation of the software in real time.
      (ii) To enable navigation of said software in a multi occurrence and multi processing environment.

[03] Conducting business activities automatically by acting as the sole driving force in the course of conducting activities of business operations is enabled by the automation of the software in accordance with the adapted principle of servomechanism feedback closed loop control system of engineering that is made suitable for adaptation by this non-mechanical software for business system. The software is enabled to generate feedback automatically from its own data tables by a technique described in para [04]. The adapted principle of servomechanism feedback closed loop control system is defined as follows:
  After conducting an activity of the sequence of activities for a particular occurrence of a business operation, the system generates a feedback by itself from its data tables to identify the immediate next activity to be conducted automatically,
  repeats the procedure by conducting the next activity generated by last feedback and then generates another feedback to identify the immediate next activity by itself from its data tables thus closing the loop,
  continues to repeat the whole procedure in cycles round the closed loop of the control system until the system generates a feedback that identifies a terminator activity of that occurrence of business operation.

In fact any system such as this software for business system operating in real time, that after an action, if capable of producing feedback automatically by itself for directing its next action, then it is suitable for automation by the said adapted principle of servomechanism feedback control system as defined for adaptation by this software. Such application of adapted servomechanism principle in a non-mechanical software for business system has not been conceived anywhere yet and this may be the main reason for not any non-mechanical robotic software for business system available yet.

[04] Automatic generation of feedback by the software has been made possible by an innovative "Data Driven Automatic Generation of Feedback" (DDAGF) technique. This technique is applied:

(a) For initial design of inter-related fields as available in the standard templates of the data tables of this software and are suitable for use by any user organisation. These fields enable entering identity of the immediate next activity in the instances of the templates of data tables for business activities of any user organisation of this software in accordance with their business procedures during installation of the software.

For creating and populating instances of the templates of the data tables during installation of the software by running a built-in user interactive program of this technique for taking input of data contained in the business activity flowcharts of the user organization to enable the software to enter the identity of the immediate next activity to be conducted in the inter-related fields of the instances of the activities involved in a business operation. Therein a business activity flowchart is defined as the flowchart of all possible sequences of activities (processes and events) with all variations of sequences that may be caused by involvement of any process of decision type, hereinafter referred to as decision process which is a process that has two possible results for its outcome, a positive or a negative result, and sequence of activities at that point is branched into two separate routes of sequences, one on the side of positive result and the other on the side of negative result, of two sides of the branch of the decision process and actual route of the active sequence for an occurrence of a business operation depends on the result of the decision process. The business activity flowcharts are required to be prepared by user organisation for all business operations to be covered by the software prior to installation.

[05] Thereby this software is automated by the aforesaid adapted principle of servomechanism closed loop control system. The control system of this software makes a total segregation of "automated system operations" and "human operators" and acts as the sole driving force like a human in conducting day-to-day regular business activities of business operations of an organization without any need for prompt or intervention from human operators. On the contrary, the control system is able to function robotically by dictating departments to perform processing by staff members and then pursuing progress by monitoring and communicating with the designated high authorities if there is any undue delay.

[06] There is a separate "Human Interface Gateway" system in this software for two way communication between these two segregated kinds of operators that enables the automated control system:

(a) to send alerts to concerned departments for processing by staff members,
(b) to report to the designated high authorities about any undue delay in processing by staff members,
(c) to receive notifications of new business operations and external events along with any occurrence specific information to be stored in the occurrence data tables,
(d) to get replies to alerts from departments confirming completion of processing with occurrence specific information, if any, for storing in the corresponding occurrence data table for process, and
(e) to receive responses from designated high authorities about undue delay in processing by staff members with instructions for action.

[07] The main benefit of an ongoing automated robotic software for non-mechanical business system operating in real time for conducting business activities is that the control system takes full responsibility of conducting business activities as the sole driving force, operates round the clock and does not stop after initiating an activity by alerting a department to perform processing by staff members, but continues pursuing it by taking further actions. Therefore, the system is very dynamic and effective. Robotic behaviour of the software results in much more disciplined and efficient functioning of both kinds of operators. After all, in the current era of high technology and automation, robotic start in a software for business system of this kind should pave the way for long ranging benefits in the future.

BRIEF SUMMARY OF THE INVENTION

[01] "Robotic Conductor of Business Operations Software" (RCBOS) is invented with the main objective of producing a fully automated ongoing non-mechanical robotic software for business system operating in real time for conducting business operations of any organisation. In doing so the software behaves like a human by acting as the sole driving force by taking full responsibility of conducting all day-to-day regular activities of business operations of an organisation from start to finish, as distinct from business process management type of software that are primarily for aiding and improving business functions. In the course of conducting business activities the system robotically dictates and monitors tasks of human operators of the business.

[02] Regular business activities of a business operation conducted by the software are defined as follows:

A "Business Operation" is defined as sequence of combination of related structured business activities in a particular order that follow each other to serve a particular business goal and related structured business activities conducted by this software are of two types, one type is process and the other type is event, and these two types of activities are defined as follows:

A "Process" of a business operation is defined as a method of the stages involved in performing a certain business procedure.

An "Event" of a business operation is defined as a happening of importance or outcome of a Process in the course of a Business Operation.

Hereinafter the term business activity will collectively mean overall business activity of business operation and also two related business activities of said process and said event. Whereas the aforesaid two related business activities of said process and said event hereinafter may be collectively referred to as activity or activities to mean process or event or both.

However, although overall business activity of whole of a business operation consists of combination of a number of aforesaid related activities, the particular activities involved in a business operation do not necessarily belong exclusively to the overall business activity of that business operation because any one or more of these activities can also take place in business activities of other business operations and involvement of any activity in different business operations is uniquely identified by the unique identity of the corresponding business operation.

Aforesaid sequence of activities involved in a business operation is not necessarily a fixed sequence as it may vary in different occurrences of same business operation depending on the outcome of processes in a sequence. This software can deal with such variation of sequence but does not support two or more parallel active sequences of said activities at the same time, therein parallel active sequences of activities mean two or more activities occurring simultaneously in different sequences after an activity for an occurrence of a business operation.

Conducting a Business Operation is defined as dealing with all activities involved in a Business Operation from start to finish as follows:

(1) Starting with:
  Recording of information about an occurrence of Business Operation in the data table of occurrences of Business Operation of the software, hereinafter referred to as occurrence specific information, for the following purposes:
  To keep track of each occurrence of Business Operation identified by the unique occurrence number of Business Operation in a multi occurrence and multi processing environment and thereby:
    (a) To enable retrieval of occurrence specific information about an unique occurrence of a Business Operation by user organization in real time because of the advantage offered by the operation of this software in real time.
    (b) To enable navigation of the software for determining unique identity of the event that occurred to mark start of this unique occurrence number of Business Operation.

(2) Followed by:
  (a) Conducting a Process by the software is defined as:
    Either getting a Process executed by an automated computerised processing application or initiating to get the Process performed by staff members of user organization and thereafter pursuing the activity until the Process is completed, followed by:
    Recording of information about the occurrence of the Process in the data table of occurrences of Process in the software for the following purposes:
    To keep track of occurrence of every Process identified by the unique occurrence number of the Process in the sequence of activities involved in the unique occurrence number of a Business Operation in a multi occurrence and multi processing environment, and thereby:
      (i) To enable retrieval of occurrence specific information about the unique occurrence of the Process by user organization in real time because of the advantage offered by the operation of this software in real time,
      (ii) To enable navigation of the software to determine the next activity in the sequence of activities involved in the unique occurrence number of a Business Operation.
  (b) Conducting an Event by the software is defined as:
    Recording of information about an occurrence of Event in the data table of occurrences of Event in the software for the following purposes:
    To keep track of occurrence of every Event identified by the unique occurrence number of an Event in the sequence of activities involved in the unique occurrence number of a Business Operation in a multi occurrence and multi processing environment, and thereby:
      (i) To enable retrieval of occurrence specific information about the unique occurrence of an Event by user organization in real time because of the advantage offered by the operation of said software in real time.
      (ii) For navigation of said software to determine the next activity in the sequence of activities involved in the unique occurrence number of a Business Operation.

[03] To enable the main objective of the software, it is necessary to automate the software in conducting business activities. Servomechanism closed loop feedback control system is the root of automation in mechanical systems of engineering. The principle of servomechanism feedback closed loop control system of engineering is adapted to make it suitable for adaptation by this non-mechanical software for business system. The adapted principle of servomechanism is defined as follows:

after conducting an activity of an occurrence of a business operation, the feedback closed loop control system generates a feedback by itself to identify the immediate next activity to be conducted automatically, after conducting the next activity the control system again generates feedback to identify the next activity to be conducted thus closing the loop, the whole process is repeated in cycles round the closed loop of the control system until the system generates a feedback that identifies a terminator activity that terminates conducting the current occurrence of business operation by the control system.

In fact any system, including software for business systems as this software, operating in real time as the sole driving force for its actions, that after an action, if capable of generating a feedback automatically by itself to direct its next action, then the system is suitable for automation by the adapted principle of servomechanism feedback control system as defined for adaptation by this software. The business activities conducted by this software do not occur in a single pre-determined sequential route and vary in different occurrences of the same type of business operation if one or more processes of decision type are involved in a sequence of activities. A process of decision type, hereinafter referred to as decision process, is defined as a process that has two possible results for its outcome, a positive or a negative result, and sequence of activities at that point is branched into two separate routes of sequences, one on the side of positive result and the other on the side of negative result, of two sides of the branch of the decision process and actual route of the active sequence for an occurrence of a business operation depends on the result of the outcome of the decision process.

Notwithstanding any decision processes involved in the activities of a business operation, an innovative "Data Driven Automatic Generation of Feedback" technique has been applied in this software to enable generation of feedback automatically to identify the next activity from its data tables, whereby this software is suitably automated by the defined adapted principle of the servomechanism closed loop feedback control system.

[04] However, there are other objectives of this software in the course of conducting business activities. These are as follows:

(i) Every organisation has databases mainly for accounting. Most of the organisations now-a-days use reliable and widely used vendor's databases. Processes for updating accounting databases mainly vendor's have now become very important because timely updating of such databases is intrinsically related to the efficiency of other business activities of the user organisation. So one objective of this software is to provide facility to deal with all processes for updating accounting databases mostly vendor's more efficiently.

(ii) The events that occur after normal processes that are not for updating vendor's database, can be significant landmarks of progress of a business operation and termed "Milestone" events in this software. An objective of this software is not to miss this type of events even when user organisation fails to include such an event in their business activity flowchart. A Business Activity Flowchart (BAF) is defined as the flowchart of all possible sequences of activities (Processes and Events) with all variations of sequences that may be caused by any number of decision processes involved in a business operation. If a "Milestone" event is not included in a BAF, then at the time of populating the master tables during installation of the software with a built-in user interactive program, user operator will be reminded to give a name of the event that will usually be a brief narrative stating the outcome of the preceding normal process.

[05] The control system of the software is automated by the adapted principle of the servomechanism closed loop feedback control system as defined for adaptation by this software and is named "EDFA Closed Loop Feedback Control System". This control system in addition to its main function of conducting the business activities with automatic generation of feedback by itself, has two special modules in the control loop, one for dealing with events and the other for processes to update vendor's database exclusively. The control system loop of this software is called "EDFA" that consists of four physically artificial but functionally distinct modules that are "E" for dealing with all "Events" including "Milestone" events, "D" for managing execution of all processes that are for updating vendor's "Database", "F" for receiving "Feedback" generated by the system to identify a normal process to be conducted next and "A" for taking "Action" to complete performing a normal process that results in the occurrence of a "Milestone" event and thereby closing the loop.

[06] As the modules of EDFA loop are functionally distinct, in order to perform the functions of each module in rotation, there are separate programs for functions of different modules. The modular programs are simpler and focused to specific functions of a particular module. After completion of functions in a module, the program of the current module is automatically deactivated and the program for the next module is activated.

[07] Automatic generation of feedback for this automated system is enabled by an innovative "Data Driven Automatic Generation of Feedback" (DDAGF) technique of this software that has initially designed the templates of the Master Tables of this software for three basic business activities that are business operation, event and process. These templates are available in the standard templates of the data tables of this software and are suitable for use by any user organisation. These fields enable entering identity of the immediate next activity in the instances of the templates of data tables for business activities of any user organisation of this software in accordance with their business procedures during installation of the software. The instances of these templates with inter-related fields are created and populated during installation of the software for identifying next activity to be conducted at any point in the course of conducting business activities by the EDFA Closed Loop Feedback Control System of this software with the application of a built-in program of this technique. This program receives input of data contained in the defined Business Activity Flowcharts (BAF) of business operations that are prepared by the organisation prior to installation of the software. The details of business activities (Processes and Events) in the sequences of the BAFs are provided for input of data to built-in program of the DDAGF technique of this software. This program runs in user interactive dialog sessions, by prompting user operator to select an option from a list or to enter data values contained in the BAF. While prompting and receiving input of data, the program populates the instances of the templates of master tables with inter-related fields automatically, appropriately and uniformly, regardless of variations and differences of processes and events for different business operations of an organisation. The instances of the master tables can be updated by the user organisation at any time as required after installation by using the same program of this technique that has been used to populate the instances initially. These instances of master tables enable the program of the automated control system of EDFA loop to determine the next activity in the sequence of processes and events of the business operation and thus acts as the sole driving force in conducting and dictating the activities involved in a business operation.

[08] There are also three occurrence record tables designed in the software for the said three basic business activities with these inter-related fields. In addition to the fields of master tables of three business activities, there are other occurrence specific fields to store occurrence related information one of which is Date/Time of occurrence and others can be added by user organisation to meet the needs of their accounting Database and business practice. The instances of these occurrence record tables are created and populated dynamically in the course of operation by the control system of the software for keeping track of each and every occurrence of the activities in a multi occurrence and multi processing environment, and thereby enabling retrieval of occurrence specific information by the user organisation in real time and navigation of the software.

[09] This automated control system robotically conducts and dictates what tasks need to be done where and how, including processes by human staff members. Any requirement of staff involvement is initiated by the automated control system with alert passed to them, through a separate "Human Interface Gateway" (HIG) system of the software to manage two way communications between the automated control system and human operators. Thus the design of the software makes a total segregation of "Automated Control System Operation" and "Human Operators". The central driving force in conducting day-to-day business operations being the automated control system itself and not human being, enables the control system to operate robotically by dictating human operators to do processing with alerts sent through the HIG and also managing undue delay in processing by staff members by communicating with the designated high authorities of the organisation.

[10] Automated Process Library (APL) is a very important aspect of the automated system of this software to make the software more effective and efficient. For vendor's database updates, current practice is to run these in isolation by members of staff by logging in and then entering necessary transaction data in dialogue sessions in the manner as required by the update transactions. In the context of automated conducting of business activities of this software, this practice does not serve its purpose. For most of the vendor's database updates, there is an option for automatic input of data by some technique such as "Batch Input". This is a data transfer technique that allows users to transfer datasets from their own system automatically to screens belonging to transactions of a particular vendor's database. It works by performing normal database transactions just as a user would, but it executes the transaction automatically. It is also suitable for entering large amount of data automatically instead of manual entries. IT section of the user organisation will be responsible for the internal design of the APL. The only requirement by this software is a table designed in the software to be populated by the IT department of the user organisation giving a list of the Ids of the processes that are included in the APL against the full link of the application in executable form.

[11] A prototype has been simulated for demonstrating workability of the automated EDFA Close Loop Feedback Control System of this robotic software in conducting defined business activities (Processes and Events) of an example of Business Operation that is "Serve Customer Order". The three stages of the prototype application of this software are illustrated in FIGS. 9.1, 9.2 and 9.3.

[12] The main benefit of an ongoing automated robotic software for non-mechanical business system operating in real time for conducting business activities is that the control system takes full responsibility of conducting business activities as the sole driving force, operates round the clock and does not stop after initiating an activity by alerting a department to perform processing by staff members, but continues pursuing it by taking further actions. Therefore, the system is very dynamic and effective. Robotic behaviour of the software results in much more disciplined and efficient functioning of both kinds of operators. After all, in the current era of high technology and automation, robotic start in a software for business system of this kind should pave the way for long ranging benefits in the future.

BRIEF DESCRIPTIONS OF THE DRAWINGS

FIG. 1 is a diagram of a broad view of working of the modules of EDFA Closed Loop Feedback Control System.

FIG. 2 and FIG. 2B constitute a single flowchart depicting overall broad working of the software and basic functions of each of the modules of EDFA Closed Loop Feedback Control System.

FIG. 3 is a diagram depicting the segregation of "Automated System Operation" and "Human Operators" with Human Interface Gateway system in between for managing two way communication between these two kinds of operators of business operations conducted by the software.

Figure 5A:
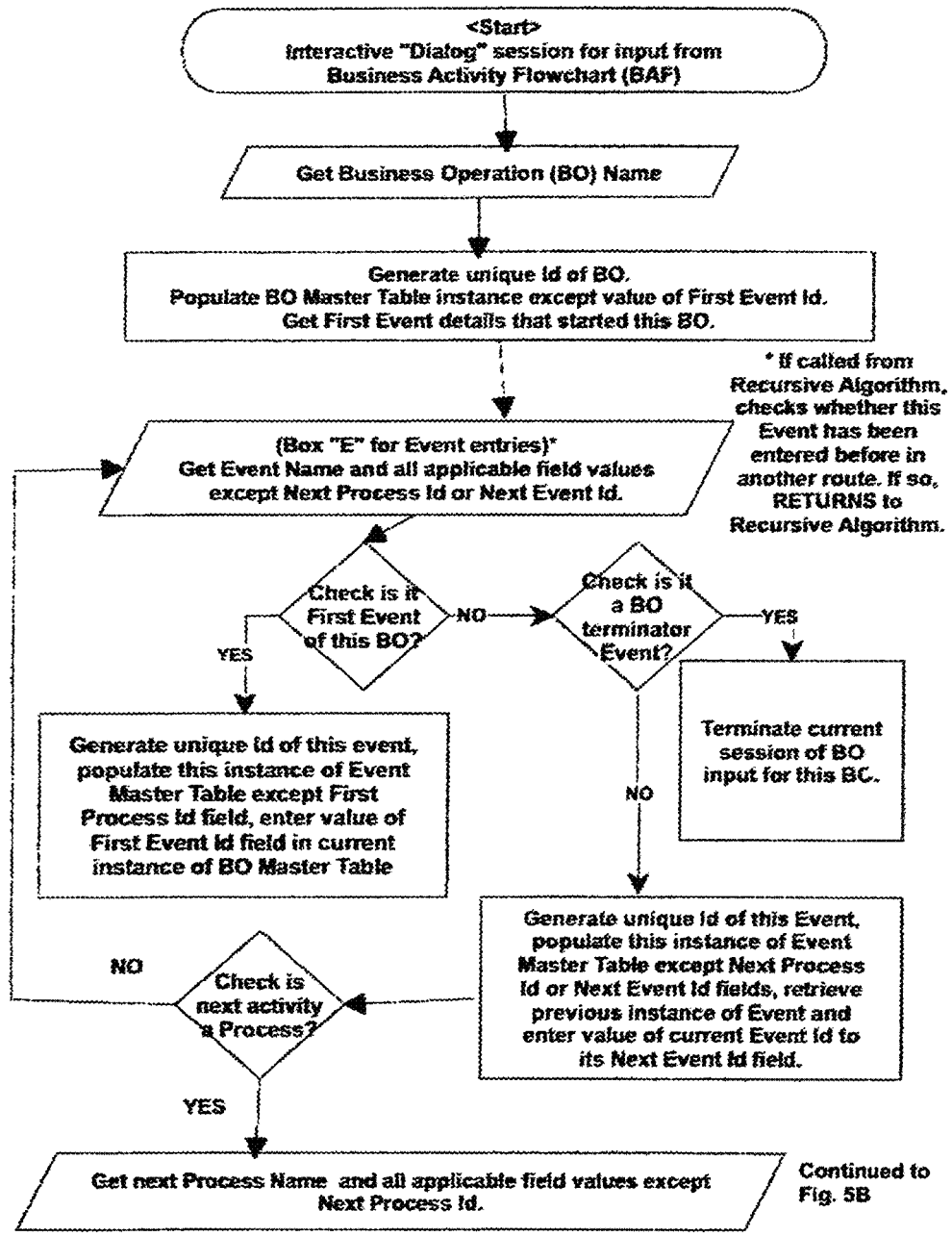
Figure 5B:
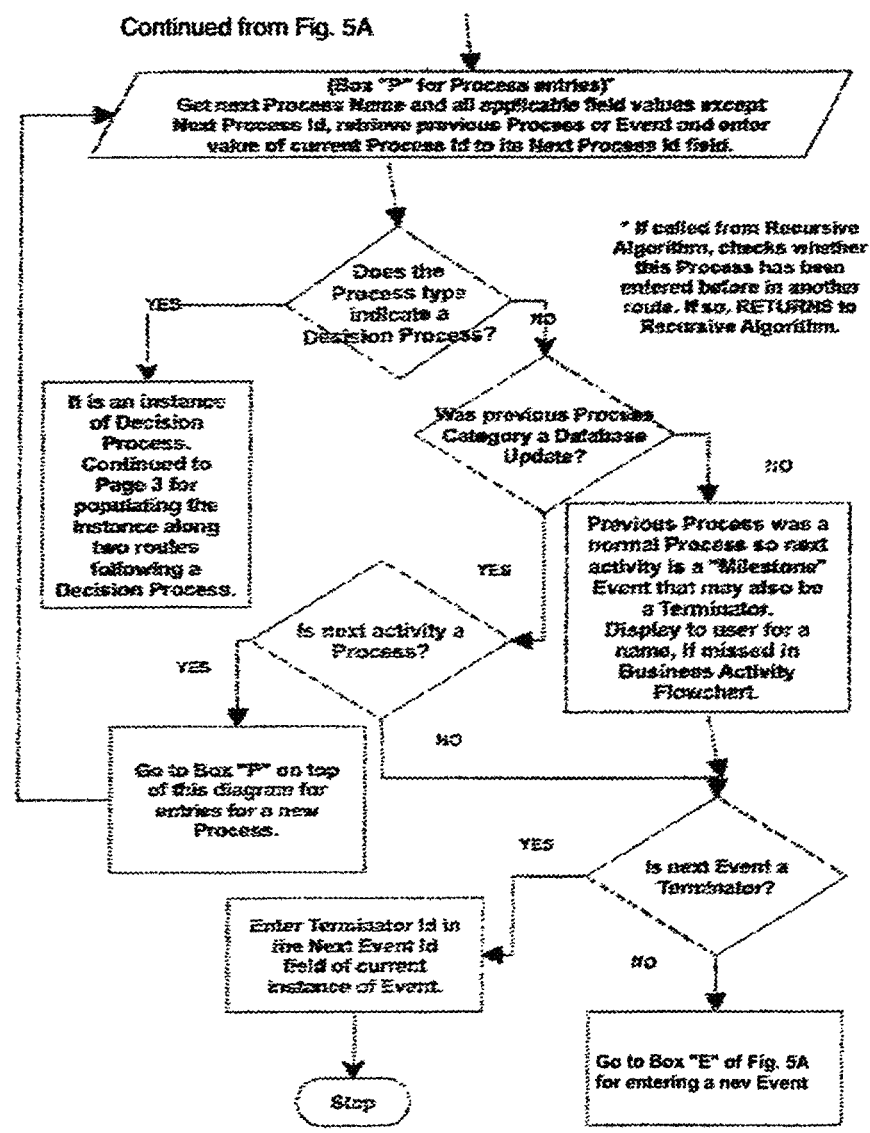
Figure 5C:
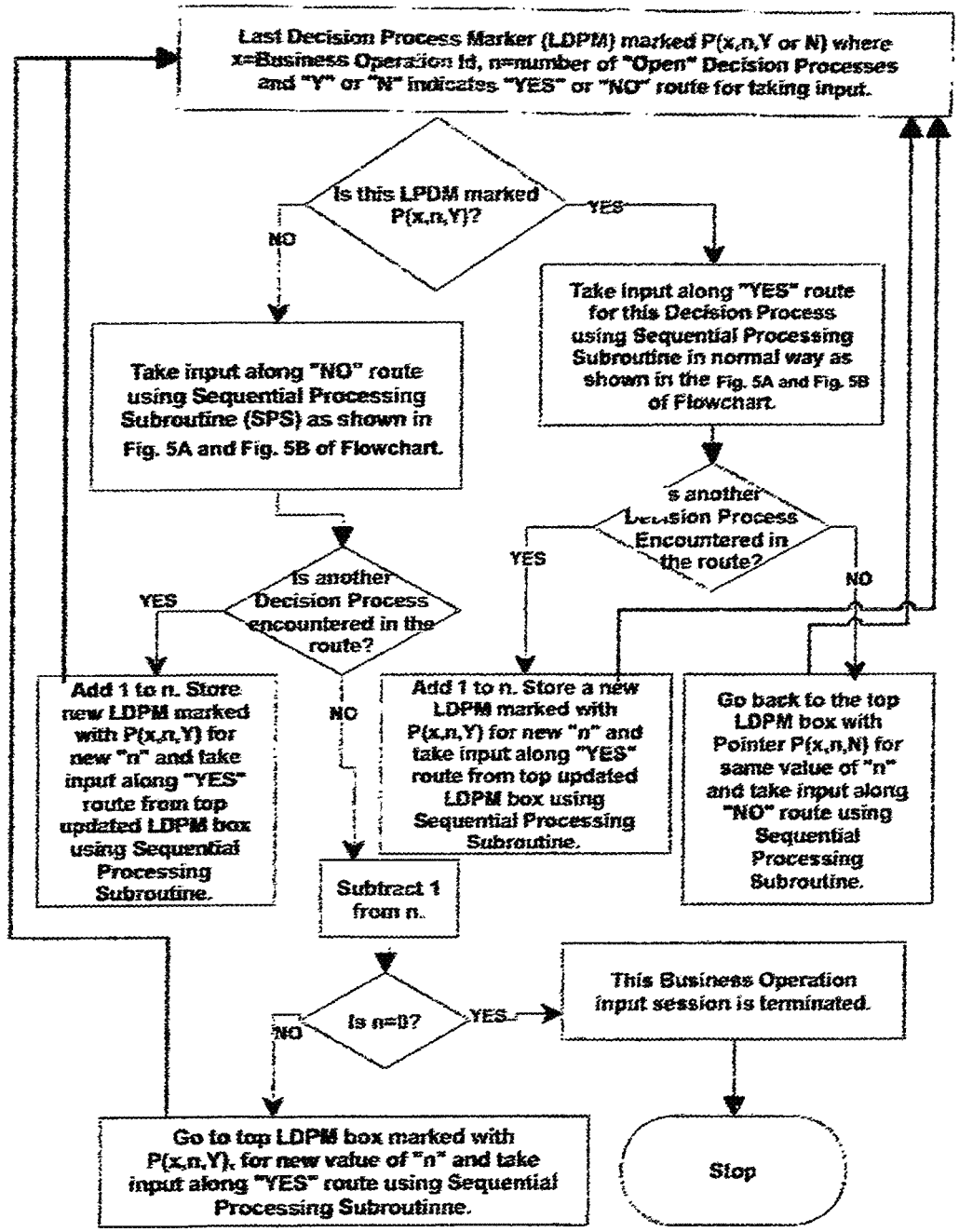

FIG. 5A, FIG. 5B and FIG. 5C constitute a flowchart of the user interactive program of "Data Driven Automatic Generation of Feedback" technique for taking input of data from Business Activity Flowcharts and accordingly creating and populating instances of the templates of the Master Tables of three business activities with vital inter-related fields to enable generation of "Feedback" automatically by the "EDFA Closed Loop Feedback Control System" of the software.

Figure 6:
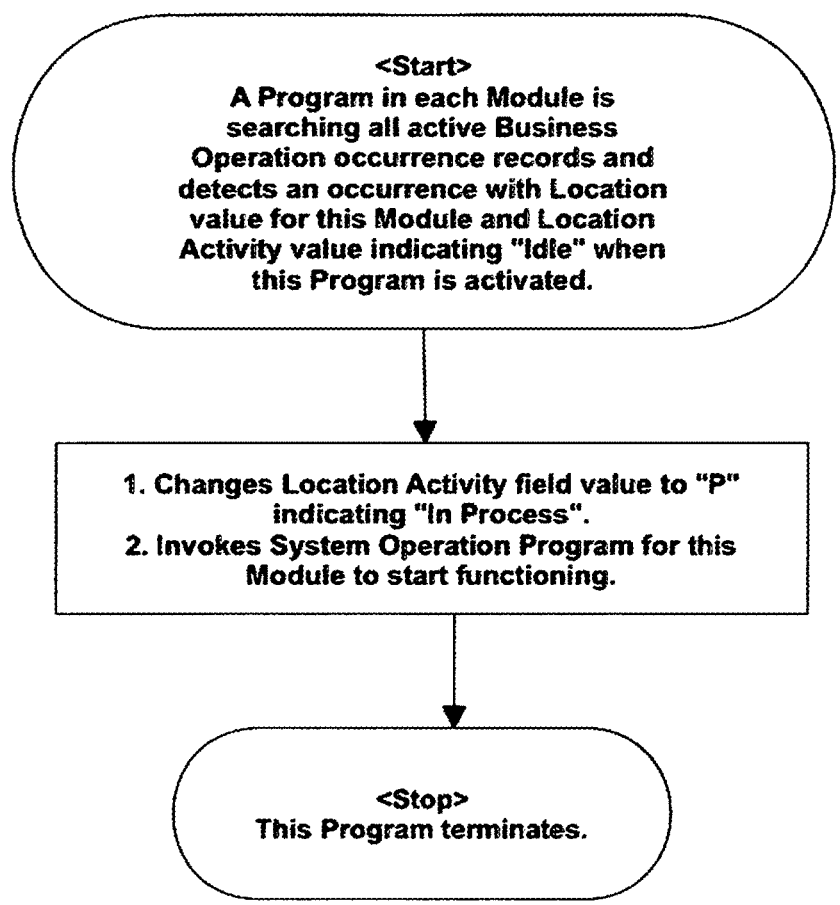

FIG. 6 is a flowchart of the "Program Starter Mechanism of Modules" of EDFA Closed Loop Feedback Control System.

FIG. 7.1 is a flowchart of the program for functions of Module "E" of EDFA Closed Loop Feedback Control System that deals with all new Events including "Milestone" Events and generates "Feedback" for passing to Module "D".

FIG. 7.2A and 7.2B constitute flowchart for functions of Module "D" of EDFA Closed Loop Feedback Control System that deals with all accounting Database Update Processes and passes "Feedback" generated for Normal Process to Module "F".

FIG. 7.3 is a flowchart of the program for functions of Module "F" of EDFA Closed Loop Feedback Control System to deal with the "Feedback" generated for conducting next Normal Process.

FIG. 7.4 is a flowchart of the program for functions of Module "A" of EDFA Closed Loop Feedback Control System that either takes action for automated processing at Automated Process Library or pursues processing by staff members alerted by Module "F". Also generates "Feedback" for passing to Module "E" to deal with the next Event or a terminator of Business Operation.

Figure 8:
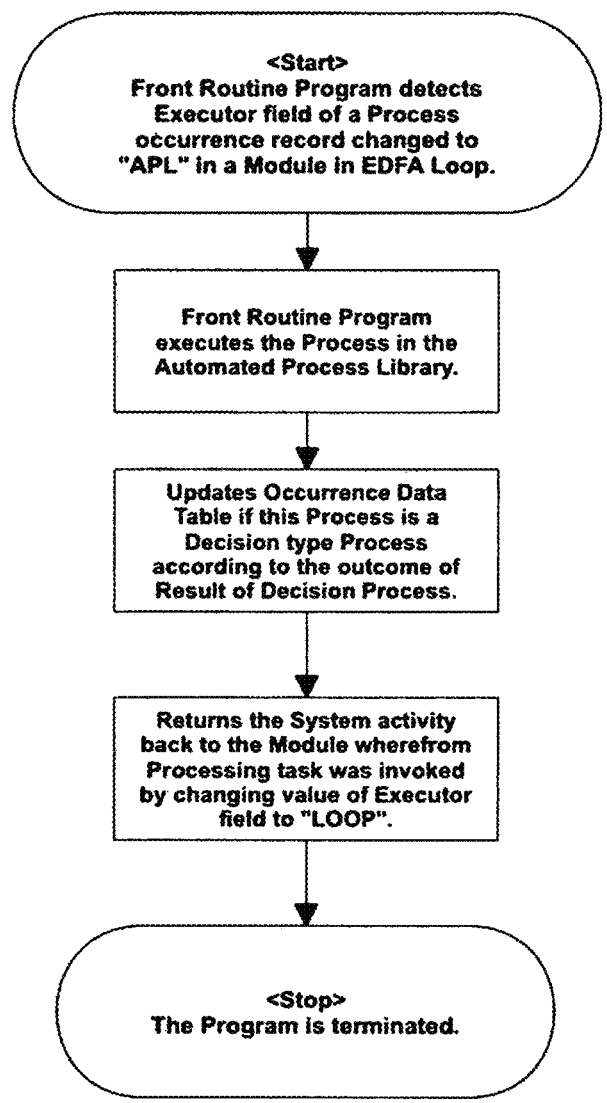

FIG. 8 is a flowchart of the "Front Routine Program" at Automated Process Library for dealing with triggers from any module of EDFA Closed Loop Feedback Control System to invoke an automated processing application.

FIG. 9.1 is a Business Activity Flowchart of an example of Business Operation used in the Stage 1 of the prototype application during installation of the software for providing input of data to the program of Data Driven Automatic Generation of Feedback for creating and populating instances of Master Tables with inter-related fields for enabling generation of "Feedback" to identify next activity to be conducted after conducting an activity in the course of conducting a Business Operation.

FIG. 9.2 shows instances of the templates of Master Tables of three business activities created and populated including inter-related fields by the Data Driven Automatic Generation of Feedback technique at Stage 2 of the prototype application of the software for the example of Business Operation.

FIG. 9.3 and FIG. 9.3B depicts the working of the EDFA Closed Loop Feedback Control System of this robotic software in conducting activities (Processes and Events) of the example of Business Operation at Stage 3 of the prototype application.

DETAILED DESCRIPTION OF THE INVENTION

[01] "Robotic Conductor of Business Operations Software" (RCBOS) is invented with the main objective of producing a fully automated ongoing non-mechanical robotic software for business system operating in real time for conducting business operations of any organisation. In doing so the software behaves like a human by acting as the sole driving force in its role with full responsibility of conducting all day-to-day regular activities of business operations of an organisation from start to finish, as distinct from business process management type of software that are primarily for aiding and improving business functions. In the course of conducting business activities the system robotically dictates and monitors tasks of human operators of the business on being automated by an adapted principle of servomechanism feedback closed loop control system of engineering.

[02] Almost all organisations have a Database in use for accounting. Most of them use well tested and widely used vendor's Database. One of the objectives of this software is updating accounting Databases of user organisations more efficiently. As most organisations use vendor's Database, system requirements for any of major vendor's Databases in use will be sufficient for application of this software. Also in running the system, staff members are not very much involved because the business activities conducted by this software are driven by the automated control system itself. As a consequence the loading on the system by human operators will be comparatively low. The main use of the system by the user organisations will be for retrieval of information in real time because of the advantage offered by the operation of this software in real time. Broad specifications of system requirements are as follows:

Hardware Requirements

Pentium 4, 2.4 gigahertz (GHz) or faster (recommended Intel Core 2 Duo (2.4 GHz with a 1066 megahertz (MHz) front-side bus).

At least 1 gigabyte (GB) of RAM (2 gigabytes recommended).

Network Requirements

Requirements by number of users:

Medium, 50 users: 2 mbps

Large, 100 users: 4 mbps

Minimum requirements:

Upstream: 1 mbps

Downstream: 1 mbps

Latency: 200 ms or better

Supported Operating Systems/Browsers

Microsoft Windows 8 or upwards:

Internet Explorer

MAC OS X 10.6 or higher:

Safari

Internet Explorer

The system URL, or alternatively the general pattern to which the URL adheres,

Is the pattern https://*.RCBOS.com

[03] Regular business activities of a business operation conducted by the software are defined as follows:

A "Business Operation" is defined as sequence of combination of related structured business activities in a particular order that follow each other to serve a particular business goal and related structured business activities conducted by this software are of two types, one type is process and the other type is event, and these two types of business activities are defined as follows:

A process of a business operation is defined as a method of the stages involved in performing a certain business procedure.

An event of a business operation is defined as a happening of importance or outcome of a Process in the course of a Business Operation.

Hereinafter the term business activity will collectively mean overall business activity of business operation and also two related business activities of said process and said event. Whereas the aforesaid two related business activities of said process and said event hereinafter may be collectively referred to as activity or activities to mean process or event or both. Hereinafter, in this document these three business activities will be written starting with a capital letter to mean what have been defined.

However, although overall business activity of whole of a Business Operation consists of a number of combination of aforesaid two related activities, the particular activities involved in a Business Operation do not necessarily belong exclusively to the business activity of that Business Operation because any one or more of these activities can also take place in business activities of other Business Operations and involvement any activity in different business operations is uniquely identified by the unique identity of the corresponding business operation.

Aforesaid sequence of activities involved in a Business Operation is not necessarily a fixed sequence as it may vary in different occurrences of same Business Operation depending on the outcome of decision type of Process, hereinafter termed Decision Process, involved in a sequence. A Decision Process is a Process that has two possible results for its outcome, a positive or a negative result, and sequences of activities at that point are branched into two separate routes of sequences, one on the side of positive result and the other on the side of negative result of two sides of the branch of the Decision Process and actual route of the active sequence for an occurrence of a Business Operation depends on the result of the Decision Process. This software can deal with aforesaid variations of sequence due to involvement of a Decision Process but does not support two or more parallel active sequences of activities at the same time, therein parallel active sequences of activities mean two or more activities occurring simultaneously in different sequences after an activity of an occurrence of a Business Operation.

[04] Templates for the three Master Tables designed for this software are as follows. The fields underlined are inter-related fields of the tables that are designed and populated by the Data Driven Automatic Feedback Generation (DDAFG) technique to enable identification of next activity to be conducted in the course of conducting a Business Operation as described in para [12].

TABLE 1

Business Operation Master Table Template

| Field | Value |
|---|---|
| BO Id | |
| BO Name | |
| First Event Id | |

TABLE 2

Event Master Table Template

| Field | Value |
|---|---|
| BO Id | |
| Event Id | |
| Event Name | |
| Event Data Key | |
| Next Event Id | |

TABLE 2-continued

Event Master Table Template

| Field | Value |
|---|---|
| Next Process Id | |
| Event Type * | |

\# Next means "immediate" next activity. If not immediate next, the field will be left blank.
* Event Types:
EX—External
IN—Internal
MS—Milestone
DUM—Dummy Event for Terminator Event (A Dummy" Event Id = "TE" for Terminator Event needs to be set up in an Instance for indicating termination of an occurrence of a Business Operation. All other fields will be blank except Type which will be "DUM" for Dummy)

TABLE 3

Process Master Table Template

| Field | Value |
|---|---|
| BO Id | |
| Event Id | |
| Process Id | |
| Process Name | |
| Next* Event Id | |
| Next* Process Id | |
| Next-N EventId | |
| Next-N ProcessId | |
| Process Type ** | |
| Result # | |
| Role/Department | |
| Normal Process Time | |
| Process Category € | |

* Next means immediate next. For Decision Process, the activity on the "YES" side of the branch of Decision Result. Leave blank if not applicable.
^"N" means on the "NO" side of the branch of Decision Result. Otherwise blank.
** Process Types:
A—Automated
H—Human
AD—Automated Decision
HD—Human Decision
AB—Abandoned
DUM—Dummy Process for Terminator (A "Dummy" Process Id = "TP" for Terminator Process needs to be set up in an instance for indicating termination of an occurrence of Business Operation. All other fields will be blank except Type which will be "DUM" for Dummy.)
\# Result = "Y" (Yes) or "N" (No)
€ Process Category:
DBU—Database Update
NORM—Normal

[05] Templates of three data tables designed for occurrences of three business activities are listed below, hereinafter referred to as occurrence data table. These occurrence data tables have the same fields of that of corresponding Master Tables of para [04] with additional fields for storing information specific to an occurrence, hereinafter may be referred to as occurrence specific information, in these additional fields hereinafter may be referred to as occurrence specific fields. In the following templates designed for aforesaid occurrence data tables, only the essential occurrence specific fields have been shown. But the software provides flexibility to user organisation to add, remove or modify any number of occurrence specific fields in the occurrence data tables corresponding to every instance of the templates of the Master Tables of para [04]. As for example, if an instance of Business Operation is "Serve Customer Order" and an instance of Event is "Customer Order Received", then occurrence specific fields in the corresponding instance of occurrence data table for that instance of Master Table for Business Operation may be "Customer Id" and "Order Reference Number", and an occurrence specific field in the corresponding instance of occurrence data table for aforesaid instance of Master Table for Event may be "Order Mode" for Online or Post etc. The essential occurrence specific fields already designed in this software are underlined. However, information to be stored in these occurrence specific fields, if added by user organisation, will need to be supplied by the concerned departments of user organisation to the automated system of the software along with the notifications of occurrences of new Business Operations and external Events for occurrence tables for Business Operation and Event, and at the time of sending message for confirmation of completion of a Process by staff members for occurrence data table for Process. The instances of these Occurrence Records Tables will be created dynamically as they occur to store occurrence specific information and to identify and keep track of each and every individual occurrence of the three business activities in a multi occurrence and multi processing environment.

Template of Business Operation Occurrence Record (BOOR) Table

| Field | Value (for illustration) |
|---|---|
| BO Id | BO1 |
| BO Occurrence No. | 1 |
| First Event Id | E1 |
| Status*. | A |
| Location**. | E |
| Location Activity***. | P |

*Status values:
Date/Time of Occurrence
A = Active,
C = Complete
**Location values:
E, D, F or D (Module identifier)
***Location Activity values:
I = Idle,
P = In process Template of Event Occurrence Record Table (EOR)

| Field | Value (for illustration) |
|---|---|
| BO Id | BO1 |
| Event Id | E1 |
| BO Occurrence No. | 1 |
| Event Occurrence No. | 1 |
| Next Event Id | |
| Next Process Id | P1 |
| Status | A |
| Event Type | EX |
| Date/Time of Occurrence | |

Template of Process Occurrence Record Table (POR)

| Field | Value (for illustration) |
|---|---|
| BO Id | BO1 |
| BO Occurrence No. | 1 |
| Process Id | P1 |
| Process Occurrence No. | 1 |
| Next Event Id | |
| Next Process Id | P2 |
| Next-N Event Id | |
| Next-N Process Id | |
| Process Type | A |
| Result | |

-continued

Template of Process Occurrence Record Table (POR)

| Field | Value (for illustration) |
|---|---|
| Status | A |
| Role/Department | |
| Normal Process Time | |
| Process Category | DBU |
| Date/Time of Occurrence | |
| Elapsed Time | |
| Executor | |

\* Next activity after branching to negative decision result for Decision processes
Value = "APL" when sent to Automated Process Library for processing;
Value = "LOOP" when processing is completed.

[05] Conducting three business activities of a Business Operation is defined as follows: Conducting a Business Operation is defined as conducting all activities involved in a Business Operation from start to finish as follows:
(3) Starting with:
Recording of information about an occurrence of Business Operation in the occurrence data table for Business Operation of the software for the following purposes:
To keep track of each occurrence of Business Operation identified by the unique occurrence number of Business Operation in a multi occurrence and multi processing environment and thereby:
(c) To enable retrieval of occurrence specific information about an unique occurrence of a Business Operation by user organization in real time because of the advantage offered by the operation of this software in real time.
(d) To enable navigation of the software for determining unique occurrence number of the first Event that marks the start of this unique occurrence number of Business Operation.
(4) Followed by:
(c) Conducting a Process by the software is defined as:
Either getting a Process executed by an automated computerised processing application or initiating to get the Process performed by staff members of user organization and thereafter pursuing the activity until the Process is completed, followed by:
Recording information about the occurrence of the Process in the occurrence data table for Process in the software for the following purposes:
To keep track of occurrence of every Process identified by the unique occurrence number of the Process in the sequence of activities involved in the unique occurrence number of a Business Operation in a multi occurrence and multi processing environment, and thereby:
(iii) To enable retrieval of occurrence specific information about the unique occurrence of the Process by user organization in real time because of the advantage offered by the operation of this software in real time,
(iv) To enable navigation of the software in a multi occurrence and multi processing environment.
(d) Conducting an Event by the software is defined as:
Recording information about an occurrence of Event in the occurrence data table for Event in the software for the following purposes:
To keep track of occurrence of every Event identified by the unique occurrence number of an Event in the sequence of activities involved in the unique occurrence number of a Business Operation in a multi occurrence and multi processing environment, and thereby:
(iii) To enable retrieval of occurrence specific information about the unique occurrence of an Event by user organization in real time because of the advantage offered by the operation of said software in real time.
(iv) To enable navigation of the software in a multi occurrence and multi processing environment.

[06] This software makes a total segregation of two types of operators involved in this software and they are "Automated System Operation" and "Human Operators". The sole driving force in conducting the activities in this software is the automated system that dictates robotically what tasks are to be done where, including tasks of human operators who play a secondary role in the software. However, "to conduct" a Process also means that the role is on-going in real time and the system will wait for confirmation of completion of Processing within the normal time limit by staff members and in case of undue delay will pursue the matter further by communicating with the designated high authorities of the organisation.

[07] The ability to conduct business activities automatically by acting as the sole driving force in the course of conducting activities of Business Operation has been possible due to automation of the software by an adapted principle of servomechanism feedback closed loop control system with the ability to generate feedback automatically from its own data tables in determining the next activity to be conducted. The principle of servomechanism feedback closed loop control system of engineering has been adapted to make it suitable for adaptation by this non-mechanical software for business system and is defined as follows:
After conducting an activity of the sequence of activities for a particular occurrence of a business operation, the system generates a feedback by itself from its data tables to identify the immediate next activity to be conducted automatically,
repeals the procedure by conducting the next activity generated by last feedback and then generates another feedback to identify the immediate next activity by itself from its Master Tables thus closing the loop,
continues to repeat the whole procedure in cycles round the closed loop of the control system until the system generates a feedback that identifies a terminator activity of that occurrence of business operation.
In fact any system such as this software for business system operating in real time, that after an action, if capable of producing feedback automatically by itself for directing its next action, then it is suitable for automation by the aforesaid adapted basic principle of servomechanism feedback control system as defined for adaptation by this software. Application of adapted principle of servomechanism as defined for this non-mechanical software for business system has not been conceived anywhere and this may be the main reason for not any software available yet for automated robotic functioning in business system.

[08] However, there are other objectives of this software to fulfil in the course of conducting business activities. These are as follows:
(i) Every organisation has a Database for accounting. Most of the organisations now-a-days use reliable and widely used vendor's Databases for accounting. However, Processes for updating accounting Database of any organisation have now become very important because timely update of such Database is intrinsically related to the efficiency of other business activities of the user organisation. So one objective of this software is to deal with all Processes for updating accounting Databases mostly vendor's accounting Databases more efficiently. In this description of the software Database for accounting will be written with a starting capital letter to mean what is stated.

(ii) The Events that occur after normal Processes that are not vendor's Database update can be significant landmarks of progress of a business operation and termed "Milestone" Events in this software. Other objective of this software is not to miss out this type of Event even when user organisation fails to include such an Event in their Business Activity Flowchart. A Business Activity Flowchart is defined as the flowchart of all possible sequences of activities (Processes and Events) with all variations of sequences that may be caused by Decision Processes involved in a Business Operation. If a "Milestone" Event as defined in this software is missed in the BAF of user organisation, then at the time of creating and populating instances of the Master Tables during installation of the software, with a built-in user interactive program, user operator will be reminded to give a name of the missing Event that will usually be a brief narrative stating the outcome of the preceding normal Process.

[09] Accordingly the software has been automated by an adapted principle of servomechanism feedback closed loop control system of engineering as defined for adaptation by this software. This control system is named "EDFA Closed Loop Feedback Control System" that in addition to its main function of conducting the business activities by generating feedback, has two special modules in the control loop, one for dealing with Events and the other for Processes to update vendor's database exclusively. The control system loop of this software is called "EDFA" that consists of four physically artificial but functionally distinct modules that are "E" for dealing with all "Events", "D" for managing execution of all Processes that are for updating accounting "Database" in most cases vendor's, "F" for dealing with "Feedback" generated automatically from its data tables and "A" for taking "Action" to complete performing a normal Processes with resultant occurrence of a "Milestone" Event and thereby closing the loop. As the modules of EDFA loop are functionally distinct, in order to perform the functions of each module in rotation, there are separate programs for functions of different modules in order to make the programs simpler and focused to specific functions of each individual module.

[10] After completion of functions in a module, the program of the current module is deactivated and the program of the next module is activated automatically. As described in para [11] this is done by changing the value of Location field of the current BO (Business Operation) occurrence record of BO Occurrence Record Table of para [10]. Briefly, after completion of functions in module "E", the program of this module will change the value of the Location field in the current BO occurrence record from "E" to "D" and that will deactivate program in module "E" and at the same time a program starter mechanism described in para [11] will invoke program in module "D" on detecting the value "D" in the Location field in BO occurrence record. This is termed as program "flow" in the context of the description of this software. Also, with the activation of program in the next module, "Feedback" generated and other information retrieved or created in the previous module are also made available to the next module and that process is termed as "passing" of information. Although any "Feedback" generated and information retrieved from or created in the instances of data tables does not move, but the intention in the preceding module was to make the information available to the next module. So in the description of this software and also in the drawings of flowcharts, the terms "pass program flow", "pass information" and "pass Feedback" will mean what have been stated.

Figure 1:
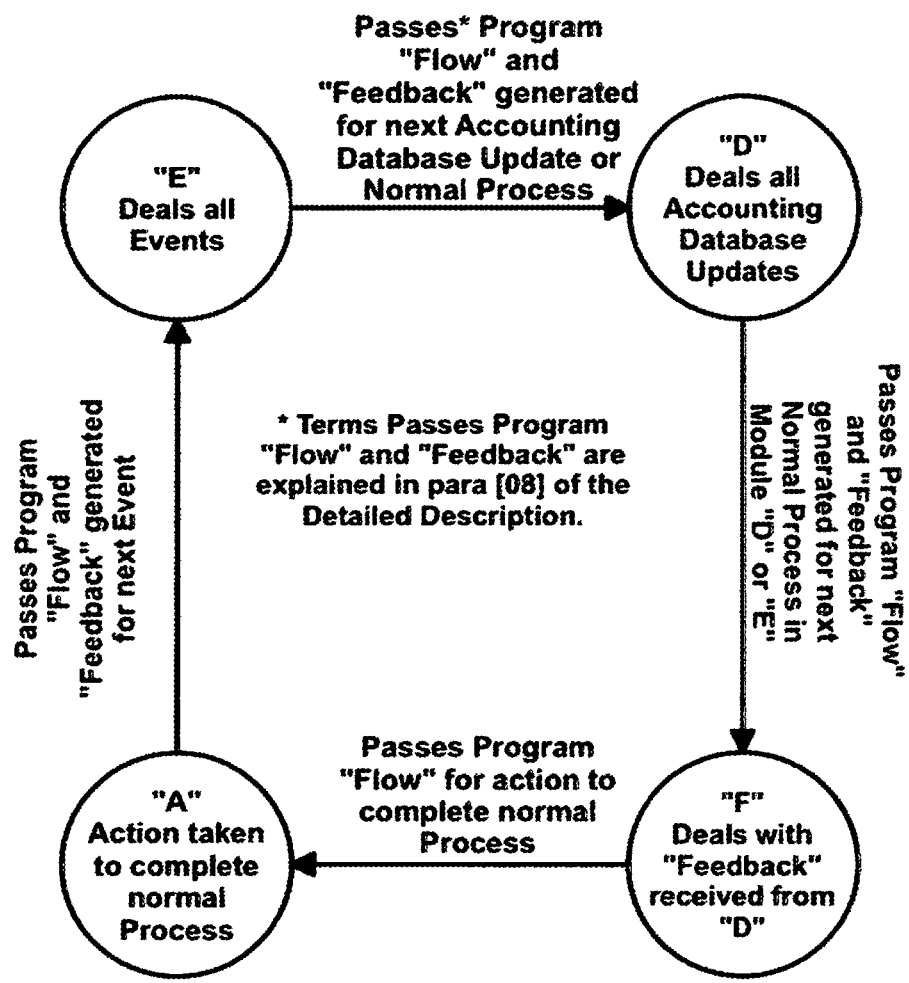

FIG. 1 is a very broad depiction of overall working of the robotic EDFA Closed Loop Feedback Control System.

Figure 2A:
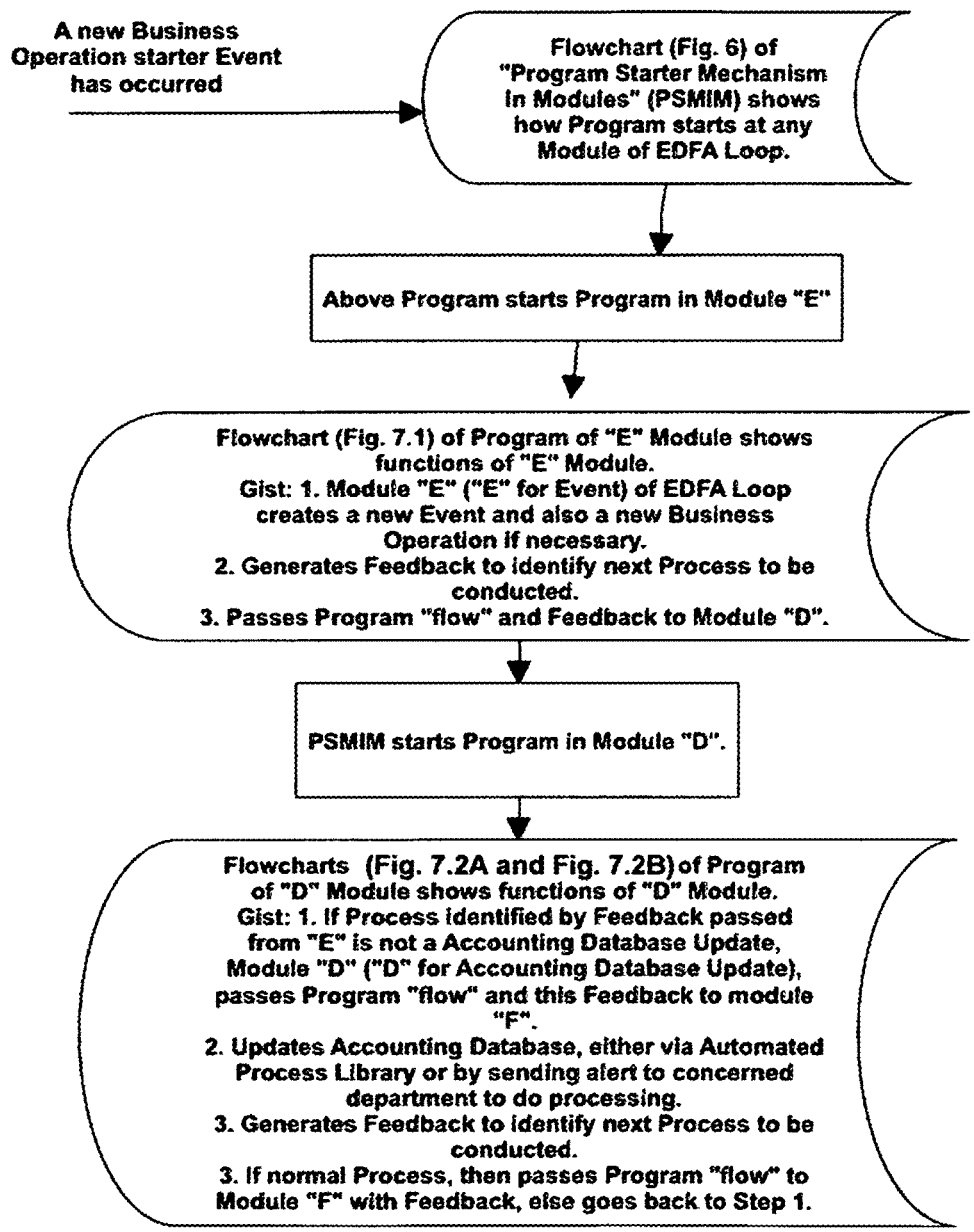

FIG. 2 (Page 1 and 2) is a broad flowchart that summarises four flowcharts of four modules of EDFA Closed Loop Feedback Control System showing overall working of the EDFA control system in a single flowchart.

[11] Notations Used:

The notation BOOR(x1,x2) uniquely identifies a particular instance of Business Operation Occurrence Record Table, where the values of its two fields, namely BO Id=x1 and BO Occurrence No=x2. Similarly, notations EOR(x1, x2,y1,y2) and POR(x1,x2,z1,z2) uniquely identify corresponding particular instances of Event Occurrence Record Table and Process Occurrence Record Table respectively, where the values of the fields, in addition to BO Id=x1 and BO Occurrence No=x2, are Event Id=y1, Event Occurrence No=y2, Process Id=z1 and Process Occurrence No=z2.

For an active occurrence of a Business Operation, current location of the active program at a particular functional module of the loop is determined by the value of the Location field of the corresponding active instance BOOR (x1,x2) of the Business Operation Occurrence Record Table that at any point in time equals one of "E", "D", "F" or "A".

Elaboration of the Concept of Program "Flow" in EDFA Closed Loop

"Flow" of program of the automated control system loop of EDFA from one module of EDFA loop to another will be in the order E-D-F-A. The meaning of "flow" of program is explained here with an example. If the current value of the Location field of the instance BOOR(x1,x2) is "E" and value of Location Activity field is "P" (means in process) then this module on completing its functions will pass "flow" of program to module "D" by changing value of the Location field of that instance of BOOR(x1,x2) from "E" to "D" and Location Activity field to "I" (means idle) and, thereby, initiate activation of the program of module "D" by the Program Starter Mechanism, described below, of that module. However, any of these modules with program for the module currently "active" there, can to the invoke execution of an automated Process at Automated Process Library by changing the value of the Executor field in the corresponding instance of POR(x1,x2,z1,z2) to "APL". Thereafter, the program in that module will remain "hanging" until re-invoked after due execution and recording of the automated Process at the Automated Process Library, with change of value of the Executor field of the POR to "LOOP".

Program Starter Mechanism in Modules (PSMIM):

The "Program Starter Mechanism in Modules" (PSMIM) is a routine Program in each module that will always be searching for the value of the Location field in all occurrences of "Active" BOORs. On detecting the value of Location field that equals identity of the module e.g. "D" for module "D" and value of Location Activity field="I" (Idle), it will activate the specific program designed for that module to start functioning by changing the value of its Location Activity field to "P" (in process). FIG. 6 is a flowchart for PSMIM Program.

[12] Generation of feedback for this automated system is enabled by an innovative "Data Driven Automatic Generation of Feedback" (DDAGF) technique. This technique is used to design initially the inter-related fields of the templates of Master Tables of this software and during installation to populate instances of the Master Tables including these vital inter-related fields for enabling generation of feedback by the software to identify the next activity automatically at any point of the sequences of Processes and Events that are being conducted for any occurrence of a Business Operation.

As stated earlier that the activities of a Business Operation are not necessarily in a fixed sequence because if there is a Decision Process in a sequence of activities of a Business Operation, it causes branching of sequence along two separate routes of sequences on two sides of the branch of a Decision Process.

Use of the technique:

(1) Initially the technique is used for designing inter-related fields in the templates of Master Tables of three basic business activities of this software. These are available in the standard templates of the data tables of this software and are suitable for use by any user organisation. These fields enable entering identity of the immediate next activity in the instances of the templates of data tables for business activities of any user organisation of this software in accordance with their business procedures during installation of the software. These inter-related fields enable entries to identify the immediate next activity after an activity in any sequence of activities notwithstanding possible variation of sequences of activities due to different outcome of results of Decision Processes involved in a sequence. These are as follows:

(a) In the template of Master Table of Business Operation:
A field named "Start Event Id" for entering identification of starting Event that starts this Business Operation.

(b) In the template of Master Table of Event two inter-related fields for entering identity of next activity in one of these:
a field named "Next Process Id" for entering identification of next Process,
a field named "Next Event Id" for entering identification of next Event.

(c) In the template of Master Table of Process four inter-related fields:
a field named "Next Process Id" for entering identity of next Process if the current Process is not a Decision Process;
aforesaid field named "Next Process Id" is also used for entering identity of next Process if current Process is a Decision Process and the next Process occurs on the positive result side of the branch of the Decision Process;
a field named "Next-N Process Id" for entering identification of next Process if current Process is a Decision Process and the next Process occurs on the negative result side of the branch of the Decision Process;
a field named "Next Event Id" for entering identity of next Event if current Process is not a Decision Process;
aforesaid field named "Next Event Id" is also used for entering identity of next Event if current Process is a Decision Process and the next Event occurs on the positive result side of the branch of the Decision Process;
a field named "Next-N Event Id" for entering identification of next Event if current Process is a Decision Process and the next Event occurs on the negative result side of the branch of the Decision Process.

Thereby these inter-related fields enable entry of identity of the next activity in one of the four inter-related fields of template of Master Table for Process if this Process is not a Decision Process or in two of the four inter-related fields if it is a Decision Process.

(2) At the time of installation of the software, a program of this technique is run to create and populate the templates including the inter-related fields of the Master Tables designed by the technique and available with this software. For this purpose Business Activity Flowchart (BAF) is required to be prepared by the user organisation for each of the Business Operations that are to be covered by the software. A Business Activity Flowchart is defined as the flowchart of all possible sequences of activities that are Processes and Events with all variations of sequences that may be caused by Decision Processes involved in a business operation. Sequences of business activities (Processes and Events) in the BAF are used for input of data to built-in program of the DDAGF technique of this software. This program is run to receive input of data contained in the BAFs of Business Operations that are prepared by the organisation before installation of the software, in user interactive dialog sessions by prompting user operator to select an option from a list or to enter data values contained in the BAF. While receiving input of data of a BAF, the program populates the instances of the templates of Master Tables with inter-related fields automatically, as follows:

(a) Input of details of a new occurrence of Business Operation are entered by the program in the fields of an instance of template of Master Table for Business Operation.

(b) Input of details of the first occurrence of Event that are entered in an instance of template of Master Table for Event, followed by entering identity of this Event in the field for "First Event id" in the aforesaid instance of Business Operation.

(c) Thereafter input of details of activities of two types in the sequence as follows:
For an Event:
Input of details of Event are entered in an instance of template of Master Table for Event followed by entry of identity of Event in the immediate preceding activity as follows:
(i) In the field named "Next Event Id" of the instance of the previous Event or Process that Is not a Decision Process.
(ii) In the field named "Next Event Id" of the instance of the previous Decision Process if next Event was entered on the positive result side of the branch of previous Decision Process.
(iii) In the field named "Next-N Event Id" of the instance of the previous Decision Process if next Event was entered on the negative result side of the branch of previous Decision Process.
For a Process
Input of details for Process are entered in an instance of template of Master Table for Process followed by entry of identity of this Process in one of the inter-related fields of the instance of immediate preceding activity as follows:
  (i) In the field named "Next Process id" of the instance of the previous Event or Process that is not Decision Process.
  (ii) In the field named "Next Process Id" of the instance of previous Process if next Process was entered on the positive result side of the branch of a Decision Process.
  (iii) In the field named "Next-N Process Id" of the instance of the previous Decision Process if next Process was entered on the negative result side of the branch of previous Decision Process.

The program is run to take input and enter details of the activities in this manner until input and entries of all activities of a Business Activity Flowchart are completed by taking input in the following order:
  (a) Sequentially from a single sequence starting with the first Event in the Business Activity Flowchart.
  (b) After a Decision Process, from sequence on the positive side of the branch of the Decision Process.
  (c) After termination of activities in a sequence on a positive side of the branch of a Decision Process, from sequence on the negative side of the branch of the preceding Decision Process.
  (d) After termination of activities in a sequence on the negative side of the branch of a Decision Process, from sequence on the negative side of the branch of the preceding Decision Process unless there is no more preceding Decision Process when the program is terminated for the Business Activity Flowchart of a particular Business Operation.

Thereby this program of DDAGF technique creates and populates instances of Master Tables appropriately and uniformly, regardless of variations and differences of Processes and Events for different types of Business Operations of the user organisation. The instances of Master Tables thus created and populated, enable the control system of the software to determine the Identity of the immediate next activity after conducting an activity from the values entered in the inter-related fields. Master Tables can be updated by the user organisation at any time as required after installation by using the same program of this technique that is used to populate the Master Tables initially.

FIG. 5 (Page 1, 2 and 3) is a flowchart of the user inter-active program of DDAGF technique for taking input of data from Business Activity Flowcharts and accordingly creating and populating instances of the templates of the Master Tables.

Details of Program of DDAGF Technique

This is an user inter-active application run in a "dialog" session with the user operator and consists of two parts which are Recursive Decision Process Algorithm and Sequential Processing Subroutine. Processing will start with the Sequential Processing Subroutine and as soon as a Decision Process is encountered the Recursive Decision Processing Algorithm will be invoked to carry out the rest of the processing using Sequential Processing Program as a Subroutine on its way.

Sequential Processing Subroutine Program

Note:
  (i) At the start of receiving input from a fresh Business Activity Flowchart (BAF) the Subroutine will start from Step 1 like a normal program and continue to full completion of this BFD unless it encounters a Decision Process when the Recursive Decision Process Algorithm will be invoked.
  (ii) Subsequently, if called from the Recursive Decision Process Algorithm, the Subroutine will commence from Step 7. The Recursive Decision Algorithm will call the Subroutine with argument (Y or N) meaning entries are to be made for "YES" or "NO" route of the Decision Process respectively. For "YES" route, Next Process Id or Next Event Id field of this instance of Process Master Table template will be entered with appropriate value and for "NO" route Next-N Process Id or Next-N Event Id field will be entered as appropriate.

Logical Steps of the Program for Sequential Processing with Normal Start at Beginning:

Step 1. Prompt to enter name of Business Operation (BO) which is entered in the instance of the template of Business Operation Master Table along with a unique Id generated by the system.

Step 2. Prompt to enter name of Event that started BO which is entered in the instance of the template of Event Master Table along with a unique Id generated by the system.

Step 3. Go to the current instance of BO and enter Event Id of Step 2 for the value of its First Event Id field.

Step 4. Ask after entering entries for an Event, whether it is a terminator of Business Operation. IF so, go to Step 5. ELSE, go to Step 6.

Step 5. Enter values of Ids of terminators pre-created as "Dummy" instances in the templates of Master Tables that are "ET" for Event and "PTERM" for Process, in the fields for next Event Id and next Process Id respectively. IF called from Recursive Decision Process Algorithm (RDPI) with arguments [n,P(n), "Y" or "N"], then RETURN with same arguments. ELSE, entering data for the current Business Operation is completed.

Step 6. Ask what is the next activity. IF Event, go to Step EE1. ELSE, go to Step EP1.

Logical Steps of Program as a Subroutine Will Start from Step 7, if Called from Recursive Decision Process Algorithm Step 7. Ask after entering entries for an Process, whether it is a terminator of Business Operation. IF so, go to Step 8, ELSE, go to Step 9.

Step 8. Enter values of Ids of terminators pre-created as "Dummy" instances in the templates of Master Tables that are "ET" for Event and "PT" for Process, in the fields for next Event Id and next Process Id respectively. IF called from Recursive Decision Process Algorithm (RDPI) with arguments [n,P(n), "Y" or "N"], then RETURN with same arguments. ELSE, entering data for the current Business Operation is completed.

Step 9. Ask what is the next activity. IF Event, go to Step PE1, ELSE go to Step PP1.

Steps of "EE" (Entries for Event after an Event)

Step EE1. Prompt for name of Event and values of all other applicable fields, generate an unique Id of the instance by the system, populate all relevant fields of new instance of Event Master Table with the values from BAF data and known value of BO Id, except the value of the Next Process Id or Next Event Id. Retrieve previous Event and enter value of its Next Event Id field=current Event Id.

Step EE2. Go to Step 4.

Steps of "EP" (Entries for Process after an Event)

Step EP1. IF a Decision Process then go to Step EP2, ELSE, go to Step EP3.

Step EP2. IF called from RDPA with arguments [n, P(n),Y of N), then RETURN with arguments [n+1, current Decision Process Id, Y or N], ELSE, invoke start of RDPA with arguments [1, current Decision Process Id, Y].

Step EP3. Prompt to give name of the Process and values of all other applicable fields except four "Next Id" fields, generate an unique Id of the new Process by the system, populate new instance of the template of Process Master Table with all of these values and also with the known values of current BO Id, Event Id in the respective fields. Retrieve previous Event and enter value of its next Process Id field=current Process Id. Go to Step 7.

Steps of "PE" (Entries for Event after a Process)

Step PE1. Prompt to give name of the Event and values of all other applicable fields, generate an unique Id of the instance by the system, populate all relevant fields of new instance of Event Master Table with the values from BAF data and known value of BO Id, except the value of the Next Process Id or Next Event Id. Retrieve previous Process and enter appropriate value of Next or Next-N Id field=current Event Id according to "Y" or "N" for appropriate route of branching as in the arguments if called from RDPA. Go to Step 4.

Steps of "PP" (Entries for Process after a Process)

Step PP1. IF a Decision Process then go to Step PP2, ELSE, go to Step PP3.

Step PP2. IF called from RDPA with arguments [n, P(n), Y of N), then RETURN with arguments [n+1, current Decision Process Id, Y or N], ELSE, invoke start of RDPA with arguments [1, current Decision Process Id, Y].

Step PP3. Prompt to give name of the Process and values of all other applicable fields except four "Next Id" fields, generate an unique Id of the new Process by the system, populate new instance of the template of Process Master Table with all of these values and also with the known values of current BO Id, Event Id in the respective fields. Retrieve previous Process and enter appropriate value of Next or Next-N Id field=current Process Id according to argument "Y" or "N" for appropriate route of branching, if called from RDPA. Go to Step 7.

Logical Steps of Recursive Decision Process Algorithm

Note: Starting value of n=1 and then changeable.

1. Create a "Last Decision Process Marker" (LDPM) for the last Decision Process encountered with the notation P(x,n,Y), where the LDPM is identified by x=Business Operation Id, and n=number of "open" Decision Processes encountered with "Y" for indicating to take input along "YES" route of the Decision Process.
2. Carry on taking input along the "YES" route of the LDPM using the Sequential Processing Subroutine with argument (x,n,Y).
3. IF returned from the Sequential Processing Subroutine on encountering a Decision Process, add 1 to n, and go to Step 1.
4. ELSE, on completion of "YES" route, Sequential Subroutine "Returns" with arguments (x,n,N), go back to LDPM marked with P(x,n,N) to identify LPDM and then take input along "NO" route of the Decision Process using the Sequential Processing Subroutine with arguments (x,n,N).
5. IF returned from the Sequential Processing Subroutine on encountering a Decision Process, add 1 to n, and go to Step 1.
6. ELSE, subtract 1 from n.
7. IF n=0 go to Step 9, ELSE, continue.
8. Retrieve LPDM stored for current value of n. Go to Step 2.
9. Input from the BAF of the Business Operation is completed.
10. End of current session of inter active program of DDAGF technique to take input of the current BAF of Business Operation after all routes are completed.

[13] This automated control system conducts and dictates what tasks need to be done where and how, including Processes by human staff. Any requirement of human involvement is initiated by the automated control system with alert passed to them, through a "Human Interface Gateway" (HIG) system for two way communication between the automated system and human operators. Thus the design of the software makes a total segregation of "Automated System Operation" and "Human Operators". The sole driving force in conducting day-to-day defined regular business activities of business operations being the automated control system itself and not human being, enables the automated system of the software to operate robotically by dictating human operators to do processing by sending alerts through the HIG and then monitoring progress.

FIG. 3 depicts the segregation of the robotic "Automated Control System Operations" and "Human Operators" with Human Interface Gateway system for managing two way communication between these two kinds of operators of business operations.

Main features of the HIG system are:

1. HIG will be connected to the Internet for exchanging messages to and from web addresses of the concerned departments or designated high authorities on the website of the organisation.
2. It will format and forward all outgoing messages from the automated system to the screens of human operator's web pages of the website of the organisation for:
   (a) Sending alerts for processing by staff members with unique occurrence numbers of Business Operation and Process for retrieval of all occurrence specific information.
   (b) Reporting to the designated high authorities about delay in processing by staff members with unique occurrence numbers of Business Operation and Process.
   (c) Receiving notifications of new business operations and external events with occurrence specific information, if any, for storing in occurrence data tables for Business Operation and Event.
   (d) Receiving replies to alerts from concerned departments confirming completion of processing by staff members with occurrence specific, if any, for storing in occurrence data table for Process.
   (e) Receiving responses from designated high authorities about delay in processing by staff members.
3. It will store all incoming messages to be accessed by the modules of the automated system.
4. HIG does the function of management of elapsed time of Processes by members of staff by communicating with designated high authorities of the organisation.
5. HIG appraises concerned authorities the necessity of automating Processes for updating vendor's databases whenever an update by staff members for carrying out the update transactions is delayed beyond normal updating time. These update Processes are very important and intrinsically related to the efficiency of organisation's own Processes.

Figure 4:
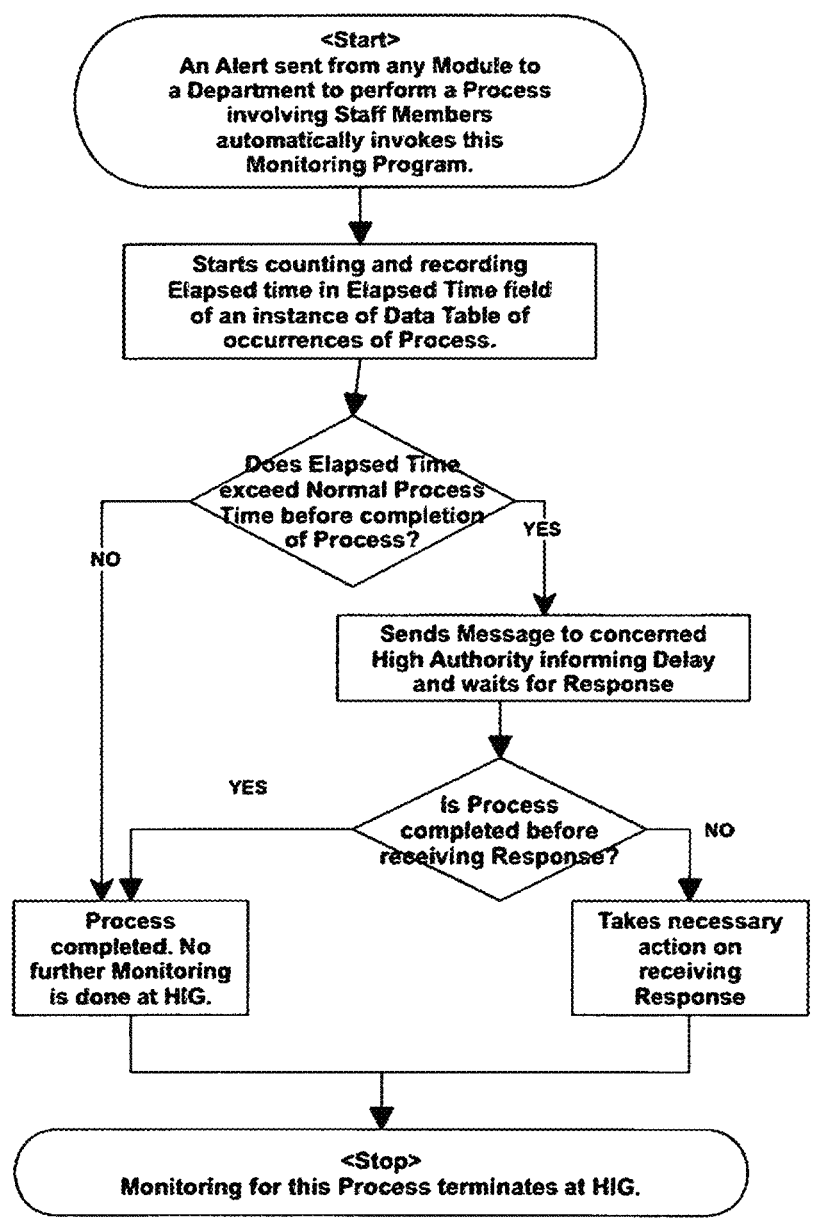
FIG. 4 is a flowchart of the program for "Management of Processing by Staff Members" at Human Interface Gateway.

FIG. 4 is a flowchart of the program for "Management of Processing by Staff" (MPS).

Logical Steps of MPS Program at HIG

1. When an alert for manual processing job is sent to the concerned department indicated by change of value of Date/Time Alerted field in the current POR(x1,x2,z1,z2) from "blank" to Date/Time of the alert, MPMP program of HIG is activated to monitor progress of the job.
2. MPS activates the Elapsed Time field of this POR to continually count the elapsed time since alert was sent.
3. IF the job is completed before value of Elapsed Time field of the current POR reaches the value of Normal Processing Time field, indicated by the value of the Status field becoming "C" (Complete) by any module of EDFA loop, no further monitoring is done. Also as soon as this POR becomes inactive, counting of Elapsed Time field stops automatically.
4. ELSE, MPS reports abnormal delay in completing this Process involving members of staff by sending a message in the Message Form "ATOHA" with details about the process for display to the concerned High Authority. Waits for the response from the concerned High Authority.
5. IF before receiving response, processing job is finished as indicated by the value of the Status field of the POR(x1,x2,z1,z2) a message notifying "Job Ref. No. xxxx has since been completed" is sent for display to the concerned High Authority and the monitoring job is terminated.
6. ELSE, necessary action as advised in the response from High Authority is taken as follows:
    (a) "Continue" meaning process will remain active till finished.
    (b) "Abandoned" meaning process is cancelled and business operation terminated.
    (c) "Treat Completed" meaning to treat process as completed.
    Accordingly entry is made in the Status field of the current POR(x1,x2,z1,z2) as follows:
    (a) No change for "Continue".
    (b) "AB" for "Abandoned".
    (c) "C" for "Treat Completed".
    and the monitoring job terminates.

[14] Functions performed by the modules of EDFA Closed Loop Feedback Control System are described as follows:

(1) Functions of Module "E"

FIG. 7.1 is a flowchart for the Program of Module "E".

Gist: Module "E" creates a fresh Business Operation, a starting Event and subsequent Events as and when they occur; determines the next Process activity for passing to module "D".

Triggers for activating module "E" to start functioning
1. A message from a department notifying external starting event of a fresh Business Operation to module "E", will automatically trigger module "E" to act according to a set of well defined functions described under "Steps of Program Logic in Module "E".
2. For a particular occurrence of Business Operation BOOR(x1,x2) when after completion of a normal (non-update Database) Process in module "A", when starter mechanism of module "E" detects the value of the Location field="E" and value of Location Activity field="I", then it changes the value of Location Activity field to "P" and invokes Step 1 of the Program in module "E" to start functioning in that occurrence of BOOR according to a set of well defined steps described below.

Logical steps of Program in Module "E"

IF activated by Trigger 1 go to Step 1, ELSE go to Step 2 with EOR set up in Module "A".

1. When activated by Trigger 1 which is a message that notifies start of a fresh Business Operation, module "E" is automatically activated to deal with new BO and Event. Module "E" then searches all currently active BOORs for the value of the field "BO Id"=x1 retrieved from the message for maximum value of the corresponding field "BO Occurrence No"=m, in order to create a new BOOR(x1,x2=m+1) with value of "Location" field="E" and "Location Activity" field="P". It also sets up the corresponding EOR(x1,x2,y1,y2), where y1=Event Id retrieved from the message and y2 is Event Occurrence No=1 at start of a Business Operation.
   [Note: Value of y2 will be 1 to start with, but at any occurrence of a new Event, the program will check whether a previous Event has recurred in the current BO Occurrence BO(x1,x2) "Stream" in which case the "Event Occurrence No" will be incremented to next number. This will be done by a subroutine, similar to what have been described for "BO Occurrence No" field in Step 1, and, therefore, not described in this document.]
2. Retrieve next non-terminator activity (Process or Event) from current EOR. IF no non-terminator activity is found, go to Step 9, ELSE continue.
3. IF Process go to Step 4, ELSE go to Step 5.
4. Set up a new occurrence of Process that is POR(x1,x2,z,z2) for the Process Id retrieved. Go to Step 6.
   [Note: Value of z2 will be 1 to start with, but at any occurrence of a new Process, the program will check whether a previous Process has recurred in the current BO/Event "Stream" in which case value of "Process Occurrence No" will be incremented to next number. This will be done by a subroutine, similar to what have been described for "BO Occurrence No" field in Step 1, and, therefore, not described in this document.]
5. Make the current EOR inactive by changing value of its Status field to "C" (complete). Set up a new occurrence of Event that is EOR(x1,x2,y,y2) for the Event Id retrieved. Go to Step 2.
6. Pass program "flow" to Module "D" with the current POR that has been set up, by changing values of Location field to "D" and Location Activity field to "I" in the current BOOR(x1,x2). Program becomes inactive in Module "E".
7. When activated by Trigger 2, it retrieves next activity of the current EOR(x1,x2,y,y2) that has been set up in Module "A".
8. IF there is no non-terminator activity found in the "Next" fields, go to Step 9, ELSE, go to Step 10.
9. Close BOOR(x1,x2), EOR(x1,x2,y,y2) and POR(x1,x2,z,z2) by changing value of "Status" field from "A" to "C" (Complete) in each of these instances in the Occurrence Record Tables which also means completion of this occurrence of Business Operation.
10. IF next activity is Event, then make the current EOR inactive by changing value of its Status field to "C" (complete), set up a new occurrence record EOR(x1,x2,y,y2), go to Step 2.
    ELSE, go to Step 6.
    [Note: A variable "y" is used for new value of "Event Id" field. As new Event may recur, hereafter, variable notation "y" will be used in all occurrences of Events.]

(2) Functions of Module "D"

FIG. 7.2 (Page 1 and 2) is a flowchart for the Program of Module "D".

Gist: Module "D" conducts special Processes for updating vendor's Databases; retrieves the next normal Process Id from data tables to pass feedback information to module "F".

However, if the next process is not a Process for updating Database then module "D" will skip this process and do the next function assigned to it which is to pass "Feedback" information about this process to module "F".

Logical steps of Program in Module "D"

1. Program Starter Mechanism in module, "D" activates program of module "D" to start functioning on detecting value of Location field="D" and Location Activity field="I" in an active BOOR(x1,x2) by changing value of Location Activity field of BOOR to "P".
2. Retrieve value of the Process Category field in the corresponding occurrence of POR(x1,x2,z,z2) of the current BO/Event "Stream".
3. IF value of Process Category field="NORM" (Normal Process) then the system does not take any action for this Process and relays the value of this Process Id field=z in the current POR(x1,x2,z,z2) as "Feedback" information to "F" module to plan about the next process due, by passing program "flow" to module "F" by usual procedure. Program in module "D" becomes inactive.
ELSE, checks value of the Process Type field in the current POR(x1,x2,z,z2).
4. IF value of the Process Type field is "H" or "HD" that requires staff involvement, then send alert message to the concerned Department Id retrieved from value of the Role field of current POR for updating Database by their staff. Waits until reply to the alert message is received confirming completion of the Process in the Incoming Message Folder at HIG with the Ref. No. of the original alert message identifying this particular occurrence of the Process. Go to Step 5. ELSE, send trigger to Automated Process Library to execute this Process by changing value of the Executor field of current POR to "APL". Waits for confirmation of completion of the Process from APL. Go to Step 7.
5. IF Manual Process Monitoring Program at Human Interface Gateway changes the value of Status field of POR before receiving confirmation of completion of the Process, then terminate current Business Operation. ELSE, continue.
6. On receiving confirmation of completion from the concerned department, retrieve value of the next activity from the current POR(x1,x2,z,z2). Go to Step 8.
7. Program remains "hanging" in module "D" with value of the Location field="D" still in the current active BOOR(x1,x2). When the value of the Executor field in the current POR is changed to "LOOP" by APL, it activates resumption of program in module "D".
8. Retrieve the value of Next activity Id field from current POR(x1,x2,z,z2). Make the current POR inactive by changing the value of its Status field from "A" to "C" (Complete).
9. IF no non-terminator activity is found, then close all current occurrences of BOOR, EOR and POR which means completion of current occurrence of Business Operation. ELSE, continue.
10. IF next activity is Process, close current occurrence of POR by changing value of its Status field to "C" (complete), set up a new occurrence of POR with Process Id just retrieved, go to Step 2, ELSE continue.
11. Close current EOR by changing value of its Status field to "C" (complete), set up a new occurrence of EOR(x1,x2,y,y2,z,z2), pass program "flow" to module "E" by usual procedure, program becomes inactive in module "D".

(3) Functions of Module "F"

FIG. 7.3 is a flowchart of the Program in Module "F".

Gist: Module "F" sends alert to concerned department if next normal Process requires involvement of staff members and passes information to module "A" for completing this Process after receiving confirmation of completion from concerned department; otherwise passes automatic Process information to module "A" to conduct.

Logical steps of Program in Module "F"

1. Value of Location field="F" and Location Activity field="I" in an active BOOR(x1,x2) triggers starter mechanism in this module to change value of its Location Activity field to "P" and activate the program for functions of module "F" to start.
2. Check value of Process Type field from current POR(x1,x2,z,z2) that was set up in module "D" as "Feedback" information.
3. IF value of the Process Type field="H" or "HD" that requires involvement of staff members, then send alert message to the concerned department, by retrieving value of the Role field in the current POR for carrying out the Process and go to Step 4. ELSE, relay POR to module "A" to get the Process done appropriately.
4. Pass program "flow" to module "A" by changing value of Location field to "A" and Location Activity field to "I" of the current BOOR(x1,x2!. Program becomes inactive in module "F".

(4) Functions of Module "A"

FIG. 7.4 is a flowchart of the Program in Module "A".

Gist: Module "A" conducts execution of next automated process passed from module "F" by sending trigger to the Automated Process Library (APL); waits for confirmation of completion from either APL or concerned department if alerted by module "F"; retrieves next Event that is a "milestone" Event after a normal Process for passing to module "E".

Logical steps of Program in Module "A"

Note: According to the principles of the EDFA control loop system and the functions assigned to the modules, a new Event must occur after a normal Process. The function assigned to the module "A" is to get the processing done for normal Processes only and not any updating of Database that is a function of Module "D". Therefore, after completion of each Process in module "A", a new EOR is set up for the new Event, even if it is the last Event before termination of current Business Operation.

1. Value of Location field="A" and Location Activity field="1" in an active BOOR(x1,x2) triggers program starter mechanism in this module to change value of Location Activity field to "P" and activate program for functions of module "A" to start.
2. Check value of Process Type field of the current POR(x1,x2,z,z2).
3. IF value of Process Type field is "H" or "HD" that requires staff involvement, then wait until reply to the original alert message sent from module "F" is received in the Incoming Message Folder of HIG with the Ref. No. of the original alert message confirming completion of the Process, go to Step 4. ELSE, send trigger to Automated Process Library to execute this Process by changing value of the Executor field of current POR to "APL". Wait for confirmation of completion of the Process from APL. Go to Step 6.
4. IF Manual Process Monitoring Program at Human Interface Gateway changes the value of Status field of POR before receiving confirmation of completion of the Process, then terminate current Business Operation. ELSE, continue.
5. On receiving confirmation of completion from the concerned department and value of Result, if any for Decision Process, update value of the next Event field appropriately. Retrieve value of the next activity, that must be an Event after a normal Process at module "A" from the current POR(x1,x2,z,z2). Go to Step 7.
6. APL after executing the Process returns program activity back to module "A" by updating the current POR(x1,x2,z,z2) with the appropriate value for the Next Event Id field depending on the value of Result field for a Decision Process.
7. Retrieve next Event Id of the updated current POR.
8. Set up a new Event occurrence EOR(x1,x2,y,y2), where y=value of the Next Event Id of the current POR(x1,x2,z,z2). Make both current EOR(x1,x2,y1,y2) and POR(x1,x2,z,z2) inactive by changing value of the Status field of each of these to "C". Pass program "flow" to module "E" by usual procedure. Program becomes inactive in module "A".

[15] Recording of "Milestone" Events is one of the major objectives of this software and also of great importance to the business of the user organisation. These are the Events that occur after completion of every normal Process in module "A". Occurrences of these Events are recorded in the Event Occurrence Record (EOR) Table in the course of conducting activities of a particular occurrence of a Business Operation and regarded as "Milestone" Events of that Business Operation. These "Milestone" Events are all stored uniquely in the Event Occurrence Record (EOR) Table and clearly identified for retrieval of information easily by the user organisation.

[16] Automated Process Library (APL) is a very important aspect of the automated system of this software in order to make it more effective and efficient. As regards computerised processes of an organisation and for vendor's accounting Database updates, current practice is to run these in isolation by members of staff by logging in and then entering necessary input data in dialogue sessions in the manner as required by the application. In the context of an automated system driven business operations like this software, this practice does not serve its purpose. Because, Processes to run such applications, although computerised, are regarded as "H" (human) type processes by this software as they require involvement of staff members in performing the tasks. So, to get the full benefits of an automated system driven business operations offered by this software, user organisations are advised to add fully automated processing programs in the Automated Process Library. For organisation's own computerised processing applications, there should not be much of a problem for necessary changes to make these fully automatic thus eliminating need of staff members to do this job in a dialog session. As regards updates of vendor's Databases for accounting, there is option for most of the vendor's Databases for automatic input of data by some technique such as "Batch Input". This is a data transfer technique that allows users to transfer datasets from their own system automatically to screens belonging to transactions of a particular vendor's Database. "Batch input" procedure can be used as an alternative to execute a "dialog" transaction for updating vendor's Database, where some or all of the screens are processed by the technique automatically. It works by carrying out normal Database transactions just as a user would, but it executes the transaction automatically. It is also suitable for entering large amount of data automatically instead of manual entries. IT section of the user organisation will be responsible for the internal design of the APL. The only requirement by this software is a table giving a list of the Ids of the Processes that are included in the APL against the full link of the application in executable form as follows:

Process Id Corresponding Link for Executable Program
P101<full link>*****.exe

When a computerised Process, whether "Normal" or "Database Update", is included in the APL, the Process Type field of this process in the Process Master Table and Process Occurrence Record Table should have value "A" (Automated) or "AD" (Automated Decision) as the case may be. Otherwise, the type should be "H" or "HD" meaning that the Process requires involvement of staff members. A built-in "Front Routine Program" (FRP) is available with the software that will handle and manage the triggers from any module of EDFA loop for execution of any automated process application that is included in the APL.

Front Routine Program

This program is for handling the triggers from modules of EDFA control system to execute automated processing applications and returning back results of outcome of the processes. FIG. 8 is a flowchart of the Front Routine Program in APL.

Logical Steps of Front Routine Program in APL
1. A module of EDFA loop sends trigger for execution of a process in the APL by changing value of the Executor field in the current POR(x1,x2,z1,z2) from blank to "APL".
2. FRP of APL is activated by detecting "APL" in the Executor field of this POR.
3. It executes the particular automated Process from the library.
4. For a Decision Process enters the result of the outcome "Y" or "N" in the Result field of POR.
5. Changes value of the Executor field of the POR from "APL" to "LOOP" to signal resumption of activity in the module of the EDFA loop from where the Process was invoked.

[17] A prototype of the software is simulated to demonstrate the workability of this robotic software in conducting activities of Business Operations with one example of a Business Operation that is "Serve Customer Order". Initial designing and creation of templates of three business activities containing inter-related fields have been done by the Data Driven Automatic Generation of Feedback (DDAGF) technique in the software. These templates are fixed for any user organisation and included in this software as listed in Para [09] of this document. Three stages of installation and working of the software in the prototype application for the example of Business Operation are illustrated in FIGS. 9.1, 9.2 and 9.3 (page 1 and 2). These three stages are as follows:

Stage 1

At initial set up stage of the software during installation, Business Activity Flowchart (BAF) as defined in Para [12] of this document is required to be prepared by the user organisation for each of the Business Operations that are to be covered by the software. FIG. 9.1 is the BAF of the example of Business Operation for this prototype application.

Stage 2

At this stage the sequences of business activities (Processes and Events) in the BAF are used for providing input of data relating to the business activities involved in a Business Operation to a built-in program of DDAGF technique of this software to create and populate instances of templates of Master Tables with the vital inter-related fields for an individual user organisation. These inter-related fields enable the EDFA closed loop feedback control system of the software to conduct activities of Business Operations of the organisation automatically and robotically. FIG. 9.2 shows the relevant fields of the instances of templates of Master Tables created and populated by the program for the example of Business Operation of this prototype application.

Stage 3

FIG. 9.3—Page 1 and 2 shows the working of the EDFA closed loop feedback control system of this robotic software in conducting activities (Processes and Events) of the example of Business Operation for the prototype application

[18] The main benefit of an ongoing automated robotic software for non-mechanical business system operating in real time for conducting business activities is that the control system takes full responsibility of conducting business activities as the sole driving force, operates round the clock and does not stop after initiating an activity by alerting a department to perform processing by staff members, but continues pursuing it by taking further actions. Therefore, the system is very dynamic and effective. Robotic behaviour of the software results in much more disciplined and efficient functioning of both kinds of operators. After all, in the current era of high technology and automation, robotic start in a software for business system of this kind should pave the way for long ranging benefits in the future.

The embodiments of the invention in which an exclusive property or privilege is claimed are defined as follows:

1. A fully automated computer-implemented closed loop feedback control system, operating uninterrupted continuously in real time, including computer-executable instructions for configuring a computer to execute the following steps, comprising:

retrieving new occurrence information of an operation from a user executable by a human interface gateway system;

managing, by one or more computers, a two way communication between the user and the computer-implemented closed loop feedback control system;

conducting, by one or more computers, processes activities and events activities;

said computer sends an alert to said user thereby dictating said user to perform the process;

automatically, invoking monitoring, by one or more computers, user performance automatically includes counting and recording elapsed time in an elapsed time field of a data table;

determining, by one or more computers, whether said elapsed time exceeds normal process time prior to completion of said process;

controlling, by one or more computers, performance by reporting any delayed performance and prompted to take action in accordance with response received from said user;

conducting, by one or more computers, an event by retrieving updated information including new occurrences of the event;

said computer automatically generates feedback from a computer-implemented dataset;

identifying, by one or more computers, new updated processes activities and events activities related to previous processes activities and events activities;

generating automatically, by one or more computers, said feedback by dynamically updating the computer-implemented dataset;

determining a variable outcome of conducting said process thereby automatically identifying the updated activities according to conditions prevailing immediately after conducting said process from the updated computer-implemented dataset;

said computer terminates said operation and marks current occurrence of said updated processes activities and events activities as terminated.

\* \* \* \* \*